(12) United States Patent
Klingman

(10) Patent No.: US 8,745,631 B2
(45) Date of Patent: *Jun. 3, 2014

(54) INTELLIGENT MEMORY DEVICE WITH ASCII REGISTERS

(76) Inventor: Edwin E. Klingman, San Gregorio, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,772

(22) Filed: Jan. 29, 2012

(65) Prior Publication Data

US 2012/0304190 A1 Nov. 29, 2012

Related U.S. Application Data

(63) Continuation of application No. 10/938,990, filed on Sep. 9, 2004, now Pat. No. 8,108,870.

(60) Provisional application No. 60/540,671, filed on Jan. 29, 2004.

(51) Int. Cl.
*G06F 9/46* (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS

| | | | |
|---|---|---|---|
| 4,209,784 A | 6/1980 | Sumner et al. | |
| 4,570,217 A | 2/1986 | Allen | |
| 4,633,750 A | 1/1987 | Sakai | |
| 4,847,751 A | 7/1989 | Nakade | |
| 4,903,223 A | 2/1990 | Norman | |
| 5,247,627 A | 9/1993 | Murakami et al. | |
| 5,471,593 A | 11/1995 | Branigin | |
| 5,655,096 A | 8/1997 | Branigin | |
| 5,677,864 A | 10/1997 | Chung | |
| 5,902,352 A | 5/1999 | Chou et al. | |
| 6,021,453 A | 2/2000 | Klingman | |
| 6,219,736 B1 | 4/2001 | Klingman | |
| 6,226,766 B1 | 5/2001 | Harward | |
| 6,243,735 B1 * | 6/2001 | Imanishi et al. | ............... 718/102 |

(Continued)

OTHER PUBLICATIONS

PCT International Search Report from PCT/US05/03139 dated Jul. 6, 2007.
New NanoAmp Technology Dramatically Boosts the Performance of Java-Enabled Wireless Handsets, Buiness Wire, San Jose, Feb. 12, 2003.
Software, Silicon Acceleration Brew a Stronger Java, Dipert, Brian, Mar. 20, 2003, EDN.

(Continued)

*Primary Examiner* — Emerson Puente
*Assistant Examiner* — Steven Do

(57) ABSTRACT

An ASCII-based processing system is disclosed. A memory is divided into a plurality of logical partitions. Each partition has a range of memory addresses and includes information associated with a particular task. Task information includes contents of task state register and one or more task data registers, with each task data register having an ASCII name. Each task data register is successively labeled with a unique alphabetic character label starting with the character 'A.' A dataflow unit within the processing system is configured to manage a mapping between registers with ASCII names and the memory addresses of a particular task. Task instructions can include ASCII characters that indicate a request for resources and indicate the ASCII-character designated names of task data registers on which the task instruction operates. A processing element receiving the task instruction performs the operation indicated by the ASCII operator code on the indicated task data registers.

16 Claims, 27 Drawing Sheets

(56) References Cited

U.S. PATENT DOCUMENTS

| | | |
|---|---|---|
| 6,275,239 B1 | 8/2001 | Ezer |
| 6,292,903 B1 | 9/2001 | Coteus et al. |
| 6,661,794 B1 | 12/2003 | Wolrich et al. |
| 6,789,212 B1 | 9/2004 | Klingman |
| 6,901,055 B1 | 5/2005 | Hoe et al. |
| 7,181,593 B2 | 2/2007 | Kirsch |
| 7,228,404 B1 | 6/2007 | Patel et al. |
| 7,383,302 B2 | 6/2008 | Cohen et al. |
| 8,108,870 B2 * | 1/2012 | Klingman ............... 718/104 |
| 2002/0120664 A1 * | 8/2002 | Horn et al. ............... 709/107 |
| 2002/0149978 A1 | 10/2002 | Fukuzawa |
| 2002/0188812 A1 | 12/2002 | Sadhasivan et al. |
| 2003/0018868 A1 * | 1/2003 | Chung ..................... 711/168 |
| 2003/0132830 A1 | 7/2003 | Dow et al. |
| 2004/0181657 A1 | 9/2004 | Armstrong et al. |
| 2004/0186843 A1 | 9/2004 | Baszczak |
| 2004/0199749 A1 | 10/2004 | Golla et al. |
| 2004/0199796 A1 | 10/2004 | Boros |
| 2005/0081181 A1 | 4/2005 | Brokenshire |
| 2005/0132121 A1 | 6/2005 | Robinson |

OTHER PUBLICATIONS

Active Memory: Micron's Yukon, Kirsch, Micron UKDC, Bracknell, UK, Proceedings of the International Parallel and Distributed Processing Symposium, 2003, IEEE.

Office Action from U.S. Appl. No. 11/046,336 mailed Jul. 17, 2007.

Office Action from U.S. Appl. No. 10/831,649 mailed Jun. 28, 2007.

Office_action_4501a_U.S. Appl. No. 10/957,431 Nov. 13, 2009.

Office_action_4701a_U.S. Appl. No. 11/004,652 Nov. 27, 2009.

Office_action_4801_U.S. Appl. No. 11/022,288 Apr. 27, 2009.

Office_action_4901_U.S. Appl. No. 11/045,904 Sep. 24, 2009.

Office_action_5001a_U.S. Appl. No. 11/046,336 Apr. 14, 2008.

Office_action_5001b_U.S. Appl. No. 11/046,336 Mar. 13, 2009.

Office_action_5101_U.S. Appl. No. 11/046,328 Sep. 24, 2009.

Office_action_5301_U.S. Appl. No. 11/046,068 Apr. 29, 2009.

Office Action From 4501 (U.S. Appl. No. 10/957,431) (Jan. 14, 2009).

Office Action From 4601 (U.S. Appl. No. 10/979,865) (Dec. 23, 2008).

Office Action From 4701 (U.S. Appl. No. 11/004,652) (Jan. 21, 2009).

* cited by examiner

INTELLIGENT MEMORY DEVICE WITH ASCII REGISTERS

CROSS-REFERENCE TO RELATED APPLICATIONS

This application is a continuation of U.S. application Ser. No. 10/938,990, filed on Sep. 9, 2004, and titled "INTELLIGENT MEMORY DEVICE WITH ASCII REGISTERS", which application claims priority to prior U.S. Provisional Patent Application Ser. No. 60/540,671, filed Jan. 29, 2004 and titled "INTELLIGENT MEMORY DEVICE ARCHITECTURE," which application is hereby incorporated by reference into the instant application.

This application is related to U.S. patent application Ser. No. 10/831,649, filed Apr. 23, 2004 and titled "INTELLIGENT MEMORY DEVICE", now U.S. Pat. No. 7,594,232, which application is hereby incorporated by reference into the instant application.

FIELD OF THE INVENTION

The present invention relates generally to computer design and computer architecture and more specifically to a new class of multi-tasking, multi-processor systems.

DESCRIPTION OF THE RELATED ART

The three major problems facing computer designers today involve (i) memory latency; (ii) multi-processor co-ordination; and (iii) compiler complexity. Intelligence, in the classical computer architecture, is located in a Central Processor Unit (CPU) or CPU array, while working storage is located in non-intelligent memory devices. Over time a vicious cycle has evolved in which operating system designers have expected faster processors and larger working memories and have designed operating systems (OSs) and associated compilers to take advantage of these improved processors and memories.

However, a dichotomy exists between random logic gates of a CPU and arrays of logic storage gates in a memory, because each physically evolved in specialized manner, due to different manufacturing optimizations. The interface between logic and memory limits current processor architecture. Attempts to minimize this problem have driven both CPU and memory design for a decade or more. Approaches to this include: (i) cache memories and pipelining; (ii) faster interfaces, such as those used in RDRAM or SRAM; (iii) on-chip memory integration; (iv) use of multi-threaded processors; (v) use of co-processors; and (vi) language improvements.

Each of these approaches is discussed below. Memory latency arguments focus on single processors, but apply to multi-processors, since memory latency is typically independent of the number of processors accessing memory.

Pipelining

Because memory technology and processor/logic manufacturing technology evolved separately, large capacity memories cannot be integrated with high speed processors on one die, so the two have classically been packaged separately and wired together. The distances and capacitances associated with this wiring involve access delays many times those involved in on-chip access. An early approach to this problem involved "pipelining," in which several registers were inserted in the path and attempts were made to keep filling the pipeline while the processor drained the pipeline. A problem with this approach is branching wherein the pipeline must be flushed and refilled at the branch target location.

Cache Memories

Pipelines evolved into on-chip cache memories to provide much faster access. By operating from cache memory, the processor can operate at full speed, until a branch occurs to a location not in cache. Probably the most prevalent strategy today is multi-level cache, with the fastest caches being the smallest and closest to the processor. For example, the Intel Itanium's level-three (L3) cache memory is too small to store lots of large pointers so it uses up to 32 Mbytes of level-two (L2) cache. Very large operating systems (OSs) try to run code from the same base address, causing aliasing problems in caches and flushes. In general, processor performance is limited by memory latency. It has been pointed out that, in the future, at 5 to 10 GHz CPU operating frequencies, a DRAM access is several thousand clock cycles. What is a processor to do during these cycles?

Of course, the obvious answer is make memory devices faster. Yet as long as the CPU and memory technologies differ, the devices will be on separate die. At high speeds, parallel busses cannot remain synchronized, so super high frequencies are used in a single serial channel. For example, the Rambus XDR™ interface is projected to hit the 6 Gigabit rate by 2006. Nevertheless, memory latencies will never be zero and the problem will not be completely solved via faster memory.

On-Chip Memory Integration

With the inability to solve the "off-chip latency problem" one might expect that "on-chip" memory provides a solution. However, due to the separate evolutionary paths taken by CPU and memory manufacturing technologies, this is unlikely to occur soon. The "off-chip" approach provides the ability to use as little or as much memory as is appropriate, unlike the "on-chip" solution where memory size is fixed. Although, in theory, many different sizes could be manufactured, the multi-million dollar, exponentially increasing costs of masks argues against this, even if the technology were feasible. System-on-Chip (SOC) devices do use on-chip, generally distributed, memory, however these devices are typically designed for cameras, cell phones, or other applications in which a fixed size of memory is feasible. SOC-relevant measures of optimality tend to be power consumption, not high speed, so this does not solve the general purpose CPU problem, which is based on the fact that CPU address space can always exceed on-chip memory capacity.

Multi-Threaded Processors

Another architectural approach to latency is multi-threading, in which programs are treated as 'threads' or loci of execution that are essentially independent of each other. When one program stalls due to memory latency, the CPU switches to execute a different thread while the first thread's cache is being refilled in an attempt to mask the effects of memory latency. Not every one agrees with this approach. Intel added multi-threading to the 386 architecture, but 386-compatible manufacturers, such as VIA and Transmeta, argue: "Multi-threading is an admission you can't keep the pipeline full" and Advanced Micro Devices, another 386 manufacturer says: " . . . putting multiple cores on a die will become a more important trend than multi-threading individual processors."

Some CPU manufacturers have introduced hardware multi-threading. For example, MIPs offers two approaches: In the first, a hardware thread manager controls which thread is running on the CPU, while the second approach uses application-level thread support, in which the operating system must keep track of the threads. The latter is compatible with thread-friendly languages such as Java, while the first may be more appropriate to programs that do not understand the thread concept. Automatically switching between threads can clobber shared resources, such as Floating-Point Computation Units, whose state typically must be saved and restored when task-switches occur. This assumes that computational resources are required only for the single thread, since true multi-tasking use of multi-register FPUs typically require complete register bank save/restore upon each task switch, and thus would appear to defeat hardware multi-threading. MIPS implies this is true by arguing that DSP hardware coprocessors are used, not because CPU instructions cannot perform the computations, but because single thread CPUs, even with real time OS, cannot guarantee hard real-time deadlines. Multi-threading allows one thread to receive a minimum percentage of CPU cycles, such that the critical task essentially runs its own virtual CPU.

Another manufacturer, Ubicom, uses a proprietary 32-bit general-purpose processor with hardware support for up to eight threads, multiple register sets, a hardware Scheduler unit and hardware allocation table to drive the Scheduler unit. By switching between register sets, the device achieves zero cycle context switching. Instead of saving and restoring register contents for each thread, each thread simply works with its own dedicated register set. Ubicom does not include FPUs, so the associated context switch problems are avoided.

Use of Coprocessors

Yet another approach to memory latency is via the use of co-processors. These have classically been I/O-oriented such as UARTs and USB controllers, Ethernet controllers, digital signal processors, disk controllers and the like.

Several recent approaches to off-CPU processing do not relate to I/O. The NanoAmp JAVA Accelerator, a coprocessor that executes JAVA byte codes, sits between the processor and memory and allows an immediate pass-through mode to allow CPU access to memory. When the accelerator is operating, it feeds the host CPU instructions to keep it occupied in a polling loop, monitoring the status of the coprocessor. This closely coupled mechanism is appropriate to a CPU executing a Java program, and very little else, since a polling processor is doing no useful work.

In contrast, the Cybernetic Micro Systems P-51 device provides a memory interface to an 8051 CPU that is seen as memory by the host CPU, while running general purpose programs in support of the host (See U.S. Pat. No. 6,021,453, titled "Microprocessor Unit For Use In An Indefinitely Extensible Chain Of Processors With Self-Propagation Of Code And Data From The Host End, Self-Determination Of Chain Length And ID, (And With Multiple Orthogonal Channels And Coordination Ports", and U.S. Pat. No. 6,219,736, titled "Universal Serial Bus (USB) RAM Architecture For Use With Microcomputers Via An Interface Optimized For Integrated Services Digital Network (ISDN)"). The advantage is that memory now becomes useful for processing data, not just storing data. The coupling between host CPU and coprocessor can be coupling via an interrupt signal line or memory mailboxes and is not limited to Java or any other type of program or program language. Programs must be specifically written to take advantage of such a coprocessor.

In a similar vein, Micron Technology has described the "Yukon," an array of memory Processing Elements to off-load the CPU. The pilot chip has arithmetic logic units with registers to improve a software pipeline to move data between the ALUs and on-chip DRAM. The Micron "Yukon" and Cybernetics "P-51" devices are the prior art believed closest to the invention described herein.

Other Solutions

Two other approaches to the problem have been suggested by Stanford University and UC Berkeley. Although Berkeley calls their approach "intelligent RAM," this is a misnomer. They essentially integrate the CPU and RAM memory on the same die, as discussed above. "The devices are called IRAMs because most of the transistors on the merged chip will be devoted to memory." So they think of the processor as being added to memory as opposed to the memory being added to the processor. This is semantical wordplay and has no relation to the "intelligent memory architecture," iMEM, described herein. Similarly, the Stanford approach includes a standard (MIPs) CPU on a chip with multiple floating point units and supporting register files. This also falls under the "SOC on-chip integration" concept, and is unrelated to the iMEM architecture of the current invention.

Languages

The above discussion focuses on the memory latency problem. iMEM is designed to ameliorate this problem, and problems associated with computer languages, such as: Assembly, Fortran, BASIC, Pascal, APL, C, C++, Forth, Java and associated compilers.

When computers were invented, memory elements (flip/flops) typically cost $100 per vacuum tube-based bit. Economics dictated binary encoding, as instructions were encoded and interpreted as efficiently as possible. For perspective we should note:

In 1971, the first computer-on-a-chip had about 1,500 gates;

In late '80s, the average ASIC size was about 10K gates;

In mid '00s, the average ASIC size was about 10M gates; and

In mid '00s, the current CPU size will be about 100M gates.

Today, with millions of logic gates and memory bits available on a chip for about $10, one must ask why binary encoding is still in use. Probably the main reason is the large number of software tools available for converting ASCII-coded programs into binary executables. As long as processors require binary executables, this is the way things will be done. In light of this history, one might ask "why ASCII?"; the more appropriate question is "why not ASCII?" The world-wide communication system, the Internet, is ASCII based; the universal data scheme, XML, is also ASCII; and all user programmable computers are typically programmed in ASCII (or the UNICODE superset) and then converted to binary instructions and/or data. Why do we need this conversion process? Coding should, by default, be ASCII, unless there is a good reason for binary encoding. Therefore, the preferred implementation of iMEM hardware is ASCII encoded, although iMEM architecture is completely compatible with a binary implementation. The primary tool for ASCII encoded hardware is an ASCII text editor.

Computer operating systems arose from the same historical economics that necessitated computer languages and compilers. Early OSs managed binary communications and mass storage and scheduled programs for execution. Later OSs supported multi-tasking, when more than one program needed to run "simultaneously." The same arguments that apply to ASCII vs. binary encoding apply to multi-tasking, and again to multi-processing. When tens of millions of gates are available for design, there is no reason to design processors in the same way that they were designed when only thousands of gates were available. As is described below, iMEM architecture is intended to address the memory latency, multi-processor coordination, and compiler complexity problems.

BRIEF SUMMARY OF THE INVENTION

A computing system in accordance with the present invention includes one or more Processing Elements, a memory with two interfaces, and a multi-task controller. The multi-task controller includes a Scheduler unit, a Dataflow unit, an Executive unit, and a Resource Manager unit.

The memory has a first interface for connecting to a host processor and a second interface and the memory being divided into a plurality of logical partitions, where each partition having a range of memory addresses and at least one partition has information describing a particular task. The information includes contents of task state register and one or more task data registers, and each task data register has an ASCII name. Each of the units of the multi-task controller (MTC) is separately coupled to each of the other units and the Dataflow unit is configured to transfer data between the second interface of the memory and one of either the Scheduler unit, the executive unit, or Resource Manager unit. The dataflow unit is also configured to manage a mapping between registers with ASCII names and the memory addresses of a particular task. The Scheduler unit is coupled to the second interface of the memory and to the Processing Elements, the Dataflow unit is coupled to the second interface of the memory, and the Resource Manager unit is coupled to the one or more Processing Elements. The Resource Manager unit is configured to find an available Processing Element for carrying out a function of a task and to assign a Processing Element to a current task by providing a linkage between said available Processing Element and the task. The Scheduler unit is configured to select a task as the current task, to obtain the state of the current task, and select an assigned Processing Element to carry out a function of the current task. The Executive unit is configured to decode ASCII-encoded instructions relating to a task and request the Resource Manager unit to set up a processing element to carry out a function of a task. The number of Processing Elements and number of tasks are independent of each other.

A method in accordance with the present invention is a method of processing one or more tasks using one or more processing elements coupled to a multi-task controller, where the multi-task controller is coupled to a memory at a first interface and a host processor is coupled to the memory at a second interface. The method includes selecting, from the memory via the first interface, a next task for execution, where the task has a stored state and a sequence of ASCII-encoded task instructions and obtaining the stored state for the selected task. For a task in a 'Ready_to_execute' state, the method includes accessing the next task instruction in the sequence. If the task instruction is 'request_resource' instruction, the method includes generating appropriate signals, setting the task state to 'Wait_for_resource', and proceeding to the step of selecting a next task. If the task instruction is a 'perform_processing' instruction, the method includes loading the relevant task data into the processing element, activating the processing element, linking the processing element to the task, setting the task state to 'Wait_for_response', and proceeding to the step of selecting a next task. If the task instruction is a 'transfer_result' instruction, the method includes unloading the result from the processing element, copying to the relevant task data register, and setting the task state to 'Ready_to_execute'. If the task instruction is a 'signal_host' instruction, the method includes generating the appropriate signal to the host, setting the task state to 'Suspend', and proceeding to the step of selecting a next task. If the ASCII-encoded task instruction specifies a non-processing operation to be performed, the method includes performing the specified non-processing function, and setting the task state to 'Ready_to_execute'. For a task in the 'Wait_for_resource' state, the method includes waiting until a processing element is available to perform a function of the selected task and setting the task state to 'Ready_to_execute.' For a task in the 'Wait_for_response' state, the method includes determining whether or not a response is available from the linked processing element, and setting the task state to 'Ready_to_execute,' and if a response is not available, setting the task state to 'Wait_for_response.' For a task in a 'Suspend' state, the method includes waiting for the host processor to set the task state to 'Ready_to_execute', after the host processor appropriately accesses the memory via the second interface.

Computer systems typically contain a processor subsystem, one or more memory spaces, and an I/O subsystem. Multi-processor systems simply multiply the above by an integer, with some means of coupling the processors. Since the 1970 Illiac-IV innumerable such systems have been proposed and many systems have been built, yet few are well known for solving any significant problems. There are at least two reasons for the general lack of success of such specialized multi-processor systems.

First, interconnection schemes are typically complex, involving multiple pathways and/or complex switching systems, with complex physical interconnect and associated algorithms.

Second, programming such systems is extremely difficult. Few tools exist for unique multi-processor architecture, and the tools created for classical architectures were designed for single-processor implementations, thus software hurdles are significant.

A third involves the economics of scale. If only a few, or a few hundred, such processors are to be built, they inevitably cost far more than processors manufactured by the millions. This applies to software issues also. Software written for multi-processor implementations costs at least as much as commercial software developed for mass-market processors, but is not amortized over millions of processors, as is commercial software.

Intelligent Memory is subject to none of the above problems. First, intelligent memory connection to the processor is (in the simplest case) identical to non-intelligent memory, and is thus compatible with all of today's processors.

Second, access to intelligent memory is identical to access to normal, non-intelligent, memory and therefore uses identical processor instructions and software.

Third, intelligent memory is subject to the same economies of scale as normal memory, which offers some of the greatest economic scale benefits existing today.

Fourth, the economics of scale that apply to memories are so great that memories tend to become low profit commodities. Intelligent memory, because of the added value, the intelligence, should command a premium, and therefore be commercially successful.

Fifth, in the default state, the intelligence should be disabled, and the memory should therefore be (conceptually) identical to normal memory. This has the extreme advantage of being compatible with all currently existing software, while offering extraordinary capability to new or extended software.

The chief advantage of the iMEM architecture is the distribution of intelligence across most of the silicon in a computer system as opposed to the typical and historical case in which all intelligence resides in the CPU and none in the memory. Note that both classical CPU/memory systems and CPU/iMEM systems may possess intelligent I/O such as storage or communication controllers, but these are incidental to and independent of the intelligence we are discussing.

For compute-intensive CPU operations, all data must flow from memory into the CPU, where the computations are performed, and the results must then flow back into memory.

This causes the CPU/memory interface to be the system bottleneck, as has been the case for a decade or so. A large portion of current computer design consists of attacking this bottleneck problem.

In compute-intensive iMEM-based systems, the data generally do not flow across the CPU/iMEM interface, except initially, and all iMEMs can be simultaneously processing data, with occasional or appropriate results being offered to the CPU. A given memory bandwidth supports far more data processing in an iMEM system than is the case for classical memory. The actual improvement is generally linear with respect to the number of iMEM devices.

A further advantage is that iMEM hides its intelligence until it is specifically requested by the CPU. Therefore startup procedures, BIOS operations, and OS operations need not be aware that iMEM exists, providing compatibility with any and all CPU systems extant.

Typical fields of application for iMEM consist of particle-in-cell problems such as weather models, or N-body tracking problems such as protein folding or UAV airspace deconfliction, etc. These are the type of problems that are currently addressed by super computers or by mesh configurations of ordinary PCs. Super computers are very expensive, and often of fixed capacity, and may be relatively deficient in software support/tools. In fact, many recent supercomputers are comprised of arrays of commercial processors, and can be augmented by iMEM with no basic architectural changes.

iMEM, unlike super computers, provides a low cost solution, which is extendable in almost unlimited fashion, with cost of system enhancement linearly proportional to the number of iMEM devices. In addition, iMEM is closely coupled to the CPU via the standard PCI (or other) memory bus, providing orders of magnitude more speed than a mesh computer network, which is coupled via serial communications channels operating typically over miles of wiring and requiring hundreds or thousands of PCs. The use of hundreds or thousands of iMEM devices is both lower cost and higher computation speed. Additionally, the power of existing mesh computer networks can be augmented by adding iMEM to each CPU in the mesh.

iMEM requires little special software since CPU operations simply initialize the data registers and read results when appropriate. If the ASCII iMEM option is implemented programming can be performed with typical text editors with no compilation required.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

The iMEM Structure

Figure 1A:
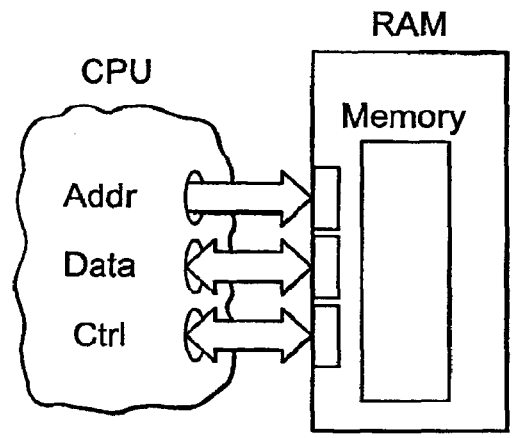
FIG. 1A shows a CPU and classical memory.
Figure 1B:
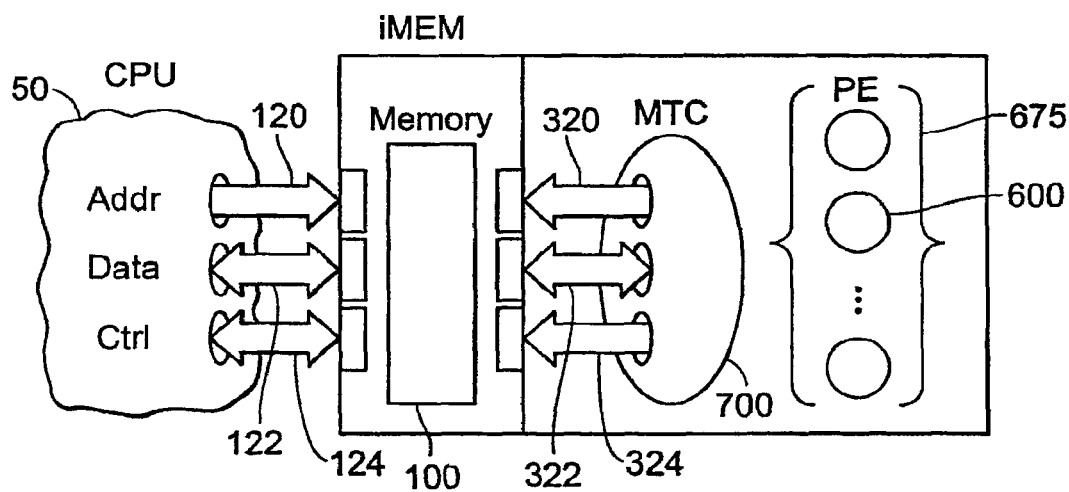
FIG. 1B shows CPU and iMEM architecture of the present invention.

Common to all of the above attempts to solve the memory latency problem, except Cybernetic's and Micron's, is maintenance of the CPU-memory dichotomy, i.e., all of the intelligence is positioned in the processor, none in the memory. The invention described herein alters this architecture as shown in FIG. 1B. The processor characteristics include (i) autonomous processing; (ii) local memory space(s) access; and (iii) I/O channels. The memory characteristics include (i) an address bus; (ii) a data bus; and (iii) a control bus (Read, Write, Enable, Ready, etc.). The intelligent memory characteristics include: (i) an address bus; (ii) a data bus; (iii) a control bus; (iv) processing disabled by default; (v) processing enabled via the memory interface; and (vi) optional I/O channels.

Figure 2A:
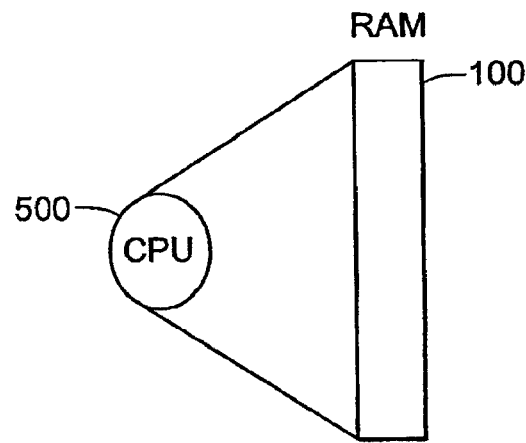
FIG. 2A shows a CPU classical memory address space.
Figure 2B:
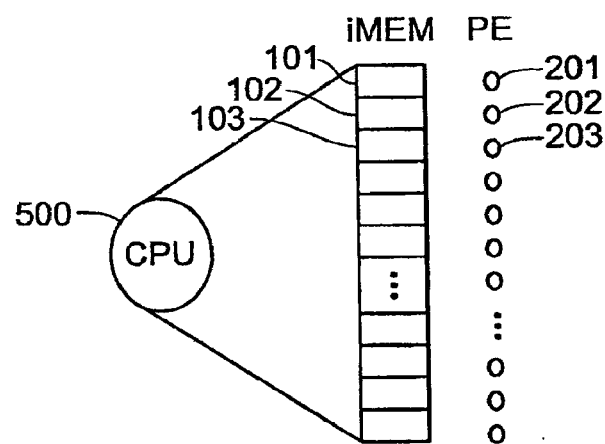
FIG. 2B shows a CPU-iMEM address space.
Figure 3A:
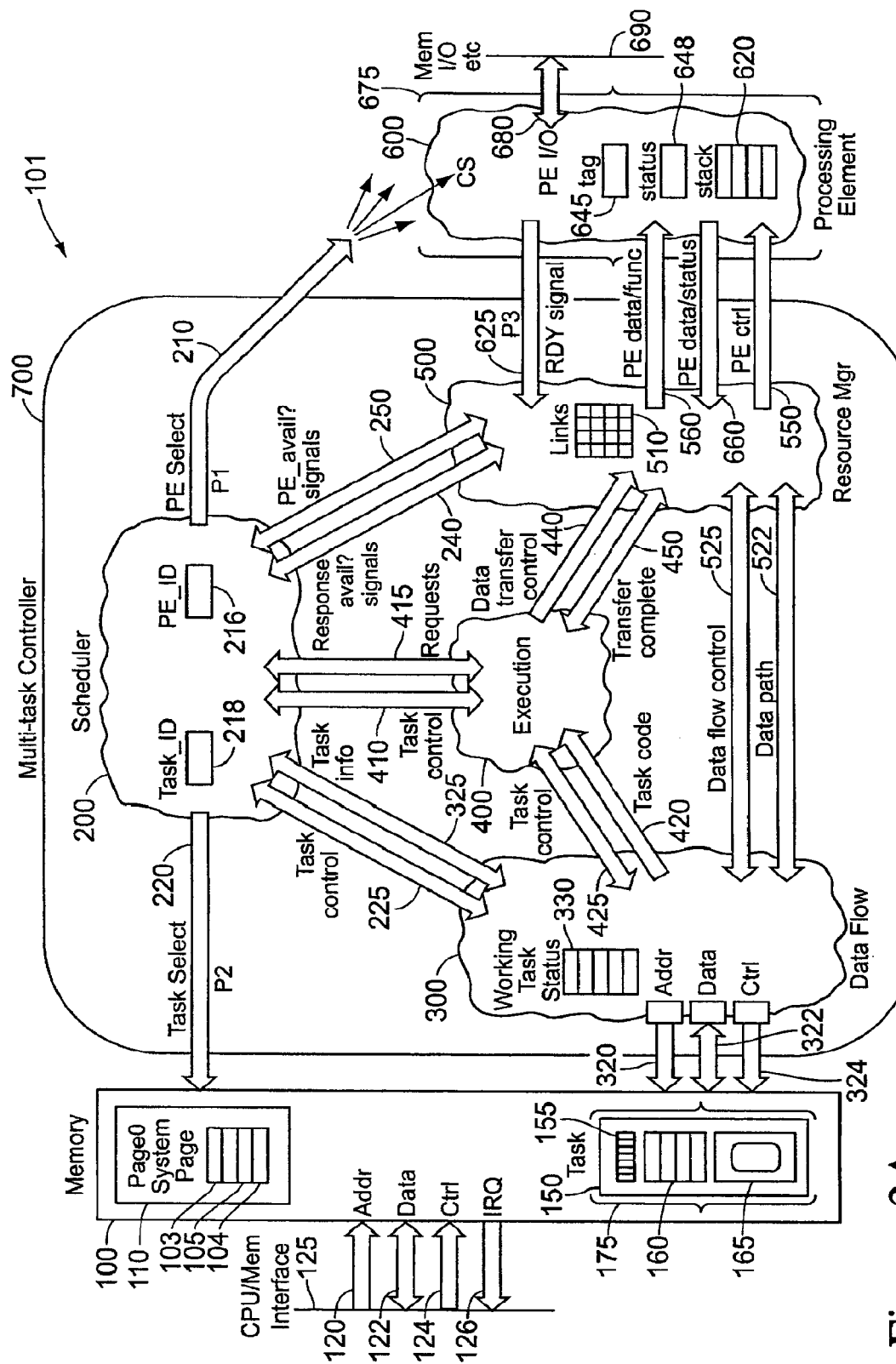
FIG. 3A shows the iMEM architectural structure and subsystems.
Figure 3B:
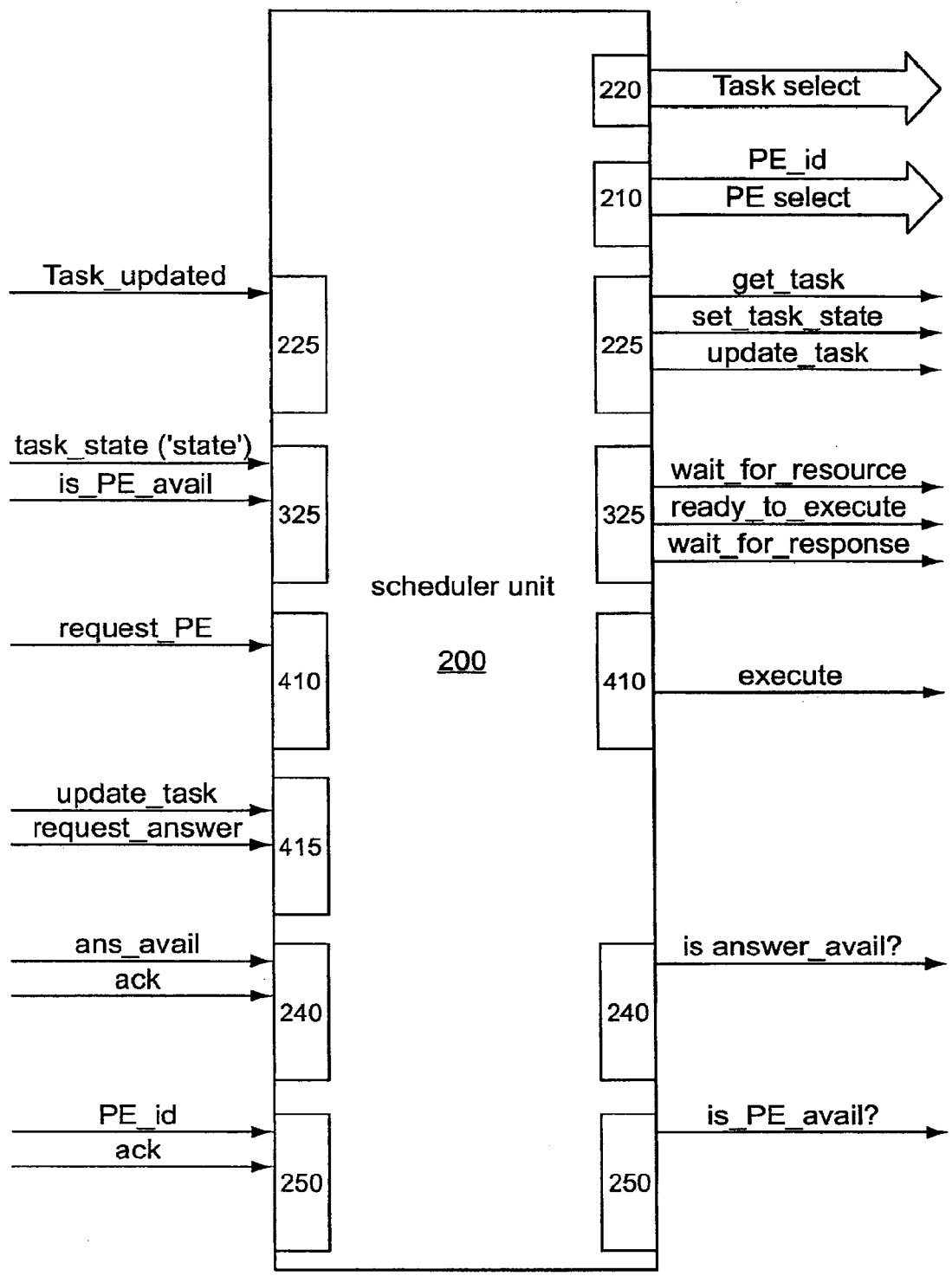
FIG. 3B shows the inputs and outputs of the Scheduler unit.
Figure 3C:
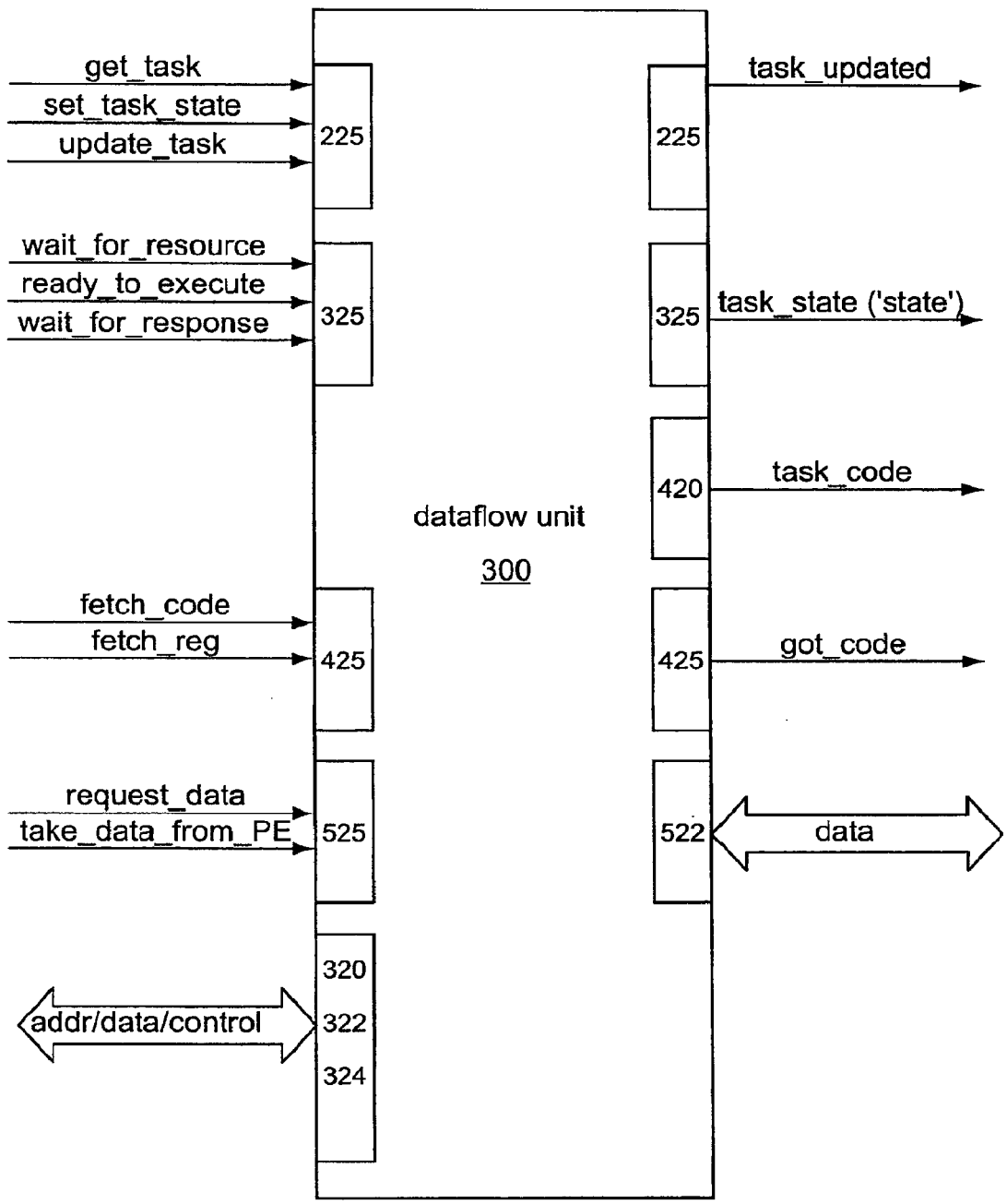
FIG. 3C shows the inputs and outputs of the Dataflow unit.
Figure 3D:
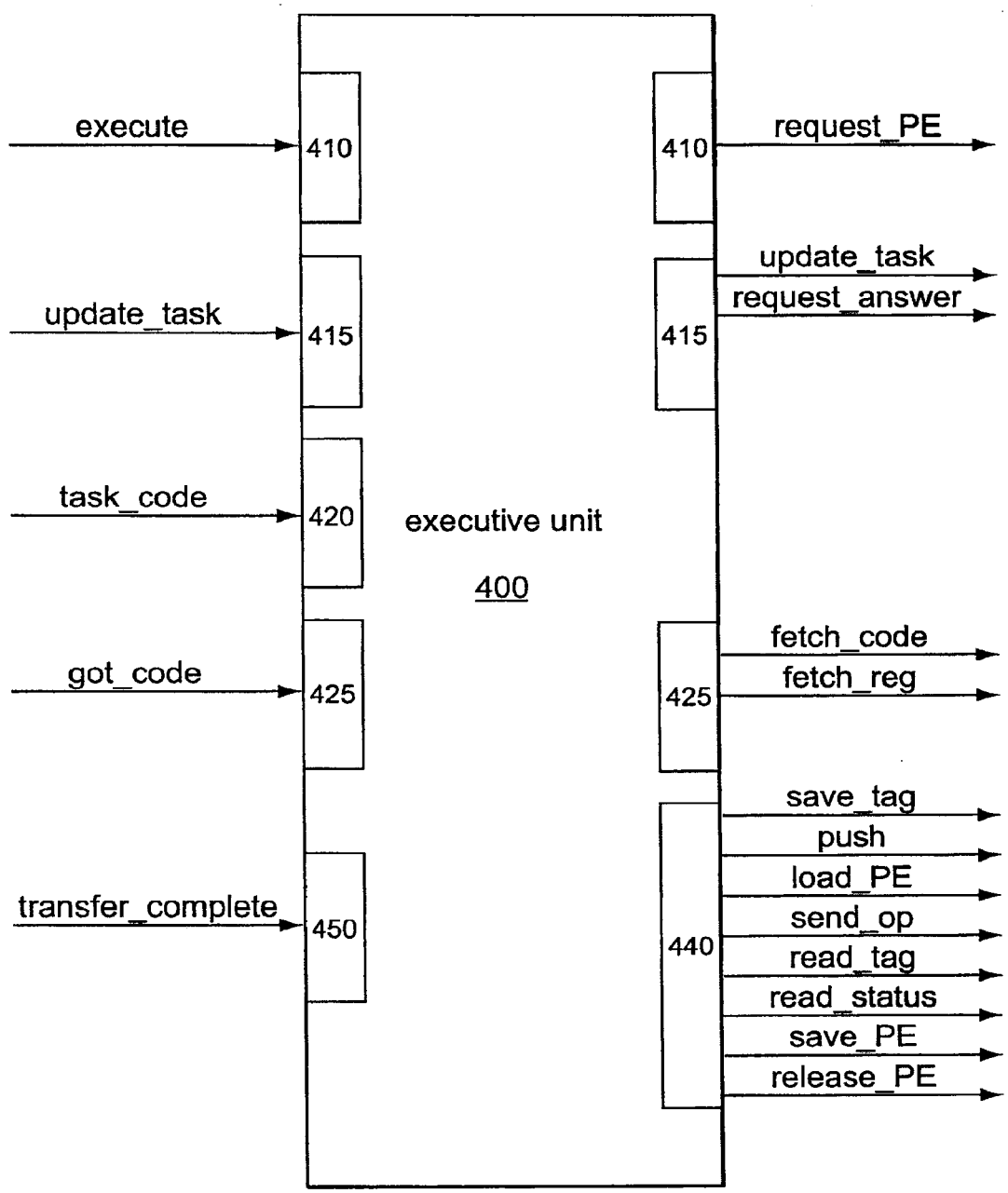
FIG. 3D shows the inputs and outputs of the Executive unit.
Figure 3E:
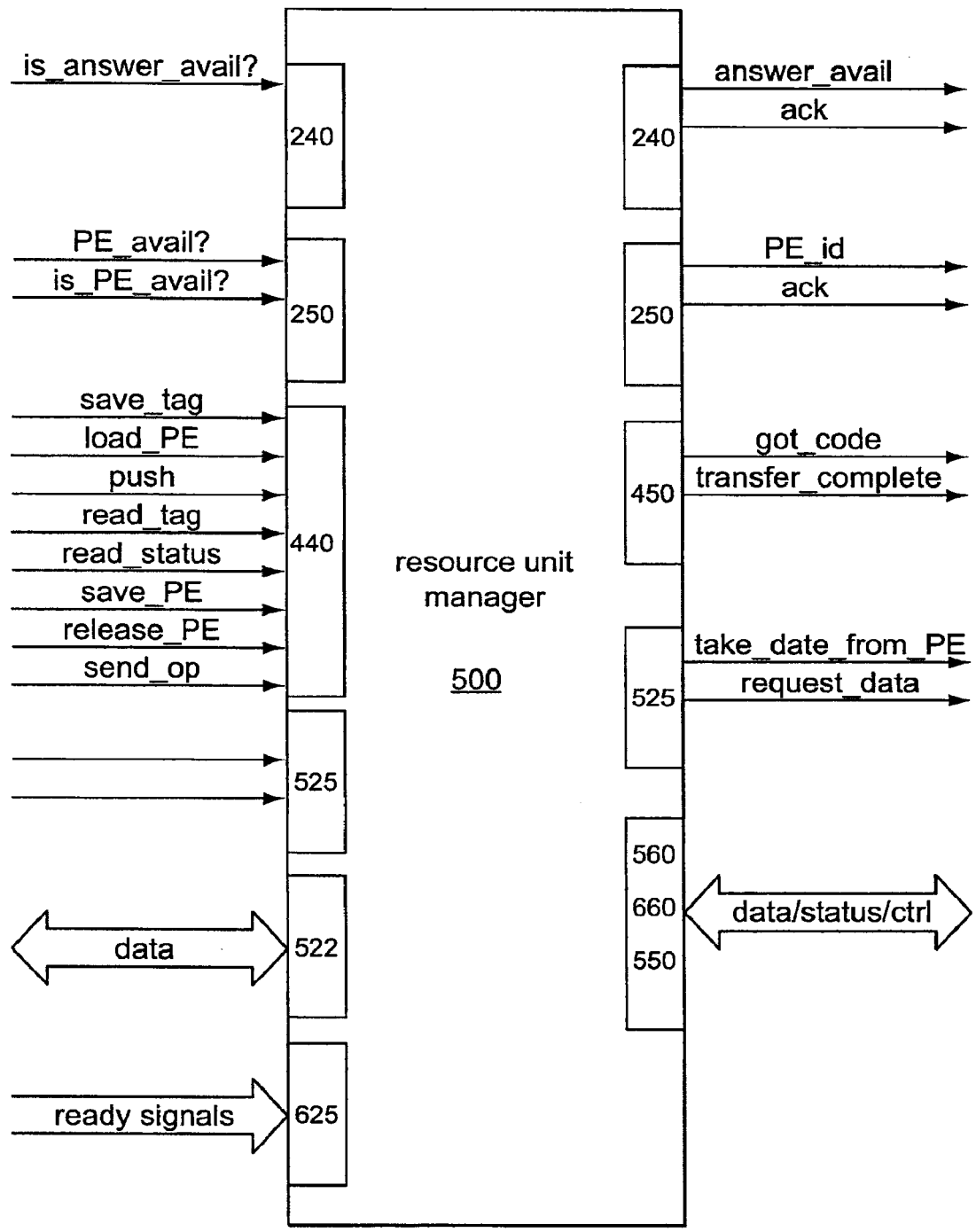
FIG. 3E shows the inputs and outputs of the Resource Manager unit.

The iMEM device looks like classical memory to the CPU 50 and responds as such to the CPU address 120, control 124, and data busses 122. Within the iMEM, however, exists considerable intelligence 700, with access to all data stored in memory 100. iMEM intelligence can access memory data, assumed placed in memory by the CPU, and either interpret or operate 600 on said data. The interpreted data guides the iMEM intelligence, which typically accesses data from memory, operates on the data, and deposits the results of the operation in the memory, at the same or another location. Optionally, iMEM can signal the CPU via a READY or INTERRUPT signal. If this option is implemented, it represents another departure from classical memory, which, with no intelligence, can never signal the use of any operation other than access. Memory address space, as it appears to the CPU is shown in FIG. 2A. Memory address space as it is implemented using iMEM is shown in FIG. 2B. The host CPU treats iMEM address ranges as pages 101, 102, 103, etc. that possess structure and that are linked to processors 201, 202, 203. However, CPU only accesses memory; there is no CPU direct access to the processor array. iMEM devices are compatible with classical memory and CPUs normally access both memory and iMEM during operation. The location of iMEM depends on system memory address decoding. CPUs generally use a PCI bridge to interface to iMEM, although the preferred iMEM implementation can also possess P-51-like pin-strapped address ranges for multi-iMEM addressing requiring no external decoding logic. The structure of iMEM is shown in FIG. 3A and the individual units are shown in FIGS. 3B-3E.

While memory interfaces to intelligent I/O have been implemented in many ways, such I/O is typically limited to relatively few channels, ISDN lines, motors, storage disks, etc. iMEM, on the other hand, is limited not by the number of extended I/O devices but by the size of the CPU address space. For 32 and 64 bit CPUs this can be quite large. Herein lies much of the power and utility of the iMEM. Often orders of magnitude more gates are implemented in memory storage than in a CPU, say 10 gigabits of memory to 10 M gates of CPU. With classical memory, those 10 gigabits have no intelligence and do no processing. Only the 10 to 100 million logic gates of the CPU process data. With iMEM, all 10 to 100 gigabits of data can be actively processing in parallel with CPU processing, potentially offering orders of magnitude increase in processing power. Current 90 nm processes allow manufacturing of 175 million gates/die and 65 nm processes are being developed.

iMEM distributed intelligence differs from multi-processor architecture, which typically replicates homogenous CPUs over an array structure. Such CPUs are then programmed in similar fashion, using say, C or JAVA languages, which are not particularly amenable to partitioning over multi-processors.

A primary goal behind the development of iMEM was to be hardware and software compatible with all processors on the market, utilizing currently available tools, not requiring new tools, and operating with current operating systems. While, in principle, iMEM processing could be implemented via a CPU embedded in the iMEM device, (such as in the Cybernetics P-51 device) the preferred implementation employs a collection of Finite State Machine (FSM)-based modules as shown in FIG. 3A.

iMEM architecture improves systems that tend to perform array operations, or operations on many sets of data that represent essentially identical elements, say atoms in a protein, or phrases in a dictionary. In such cases computation performed in memory augment the power of the CPU, possibly by orders of magnitude. In the preferred implementation iMEM intelligence can be "hidden," that is, the iMEM processing can be suspended, and iMEM reduced to classical memory functionality.

iMEM Task Structure

Figure 4:
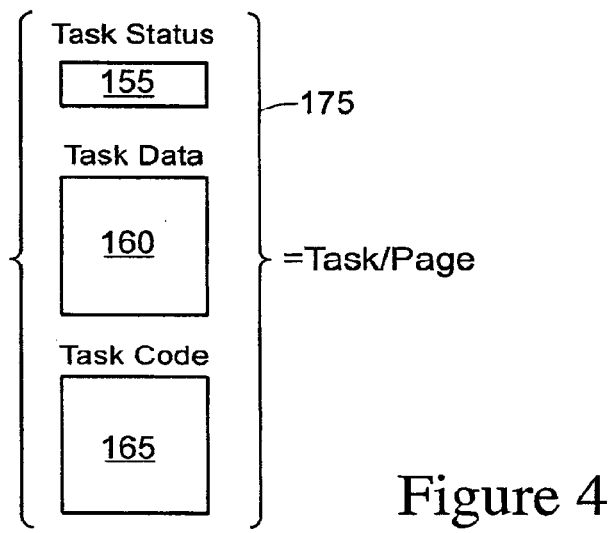
FIG. 4 shows the iMEM task/page organization.

Because many iMEM-based applications involve "many element" problems, where each element is typically represented by a data structure that is the same for all elements, and is operated on by a set of operations that are also applied to all other elements, the preferred iMEM implementation divides memory into multiple partitions, each partition containing, at minimum, the element data structure. In most cases, the partition also contains the element operations. If both element data and operations are contained in the partition, then the partition effectively becomes a task. If each element possesses essentially equivalent data structure and operations, then the memory partitions are equal sized, and are referred to as "pages." In FIG. 4, a page contains a task 175, consisting of task code 165, task data 160, and task status 155.

In the preferred implementation, shown in FIG. 3A, the first page, page 0 110, is reserved for the system, while pages 1 . . . N are dedicated to tasks 1 . . . N (represented by the curly braces 175). Also, the preferred iMEM implementation allows variable page size, where the "current" size is conveyed to the iMEM by the CPU via a "page-size" register 105 on page 0. In addition, the Tasks data/code boundary may also be variable, and also conveyed by CPU to iMEM via a "task-boundary" register 107 on page 0.

Because the preferred iMEM implementation supports multiple tasks 175 distributed over an equal number of memory pages, the iMEM controller is denoted MTC for Multi-Task Controller 700. In operation, the MTC selects the "current task" 150, accesses the task state 155, and determines the appropriate action. The preferred iMEM implementation supports at least the following states:

Executing//if different from Ready_to_Execute
Suspended
Ready_to_execute
Wait_for_resource
Wait_for_Response
Interrupting//if different from Suspended When iMEM MTC detects a Suspended task, it performs no processing, but selects the "next" task, where any appropriate "next task selection" algorithm may be used.

Interrupting tasks are those that have signaled via an interrupt Request signal or via the task status for polled systems, that CPU attention is required. The CPU, upon detecting the Interrupting state, can examine further status info to determine the cause of the interrupt. The iMEM MTC treats tasks in the Interrupting state as if Suspended, and selects the next task. The CPU, upon servicing the interrupt, can change the task state to either Suspended or Ready to Execute, as appropriate.

Suspended tasks can only be brought out of suspension via the operation of the host CPU. That is, once a task enters the suspended state in the iMEM, it remains suspended unless and until the host CPU changes its state by writing to (or possibly reading from) the relevant state-register in the specific iMEM task. The host CPU accesses memory across the interface 125, consisting of address bus 120, data bus 122, and control bus 124.

If the MTC detects that a task is Ready_to_execute, then the MTC enables the iMEM Execution subsystem and this subsystem causes the relevant task pointer to be fetched (from the task state 155 or working copy thereof 330) and used to access via interconnect 420 the next task instruction from task code space 165.

A Ready_to_execute task, depending upon the instruction executed, can remain ready, or can be suspended, or can enter a wait state, either waiting for a resource to be ready or for a result/answer/response to be available. The resource that iMEM tasks typically wait for is a Processing Element, 600, and the answer that an iMEM task awaits, is typically the result of the operation performed by the Processing Element. This result is typically the result of a data processing operation, computation, or search, but may be a time delay trigger or other non-data event.

As shown in FIG. 3A, the MTC 700 contains a Scheduler unit 200 that analyzes the task state. In the preferred implementation, the Scheduler unit selects the "next" task page (via page address bus 220) and causes the task state to be accessed. If the Scheduler unit determines the task is ready, it causes the task code to be fetched and enables the Execution subsystem 400.

Although the Scheduler unit supplies the "page" address 220, neither the Scheduler unit nor the Execution units applies (non-page) addresses to RAM. For this purpose a "data-flow" subsystem 300 is implemented. The Dataflow unit responds to control signals 225 from the Scheduler unit, signals 425 from the Executive unit, or signals 525 from the Resource Manager unit 500, and provides handshake and/or static signals to these units, using the same control busses. The Scheduler unit receives task-state information via bus 325 from the Dataflow unit and can update task-state info to the Dataflow unit over the same bus.

The Dataflow unit 300 manages the (non-page portion of the) address 320 to RAM, the READ and WRITE and ENABLE signals 324 to RAM and the data bus 322 to/from RAM. Data from the RAM is distributed to other MTC subsystems by the Dataflow unit, as appropriate.

Although the iMEM device may contain one data Processing Element, PE 600, the preferred implementation contains multiple such elements, represented by braces 675. In this case the Resource Manager unit 500 manages the control of and interface to the Processing Element 600 selected by the Scheduler unit PE select bus 210.

In the preferred implementation the multi-tasking, multi-processing element controller 700, consisting of Scheduler unit 200, Executive unit 400, Resource Manager unit 500, and Dataflow unit 300, provides a linkage between the current task 150 and any associated Processing Element (PE) 600.

The Executive unit 400 uses control bus 410 to receive signals from the Scheduler unit 200, and to advise the Scheduler unit that the task cannot execute further. A second control bus 415 is used to request either a Processing Element 600 or a response from a PE, as well as to convey the results of these requests. Although these requests originate in the Executive unit and are sent to the Scheduler unit, the Scheduler unit passes the requests to the Resource Manager unit 500 via control busses 240 and 250, which inquire as to whether a resource or a result is available and carry the response from the Resource Manager unit. The Scheduler unit uses the PE select bus 210 to enable a given processor. Although the connectivity is not shown in FIG. 3, the Resource Manager unit also monitors the Task select address 220 and the PE select bus from the Scheduler unit, as is described in iMEM operations.

The Resource Manager unit 500 also receives commands from the Executive unit over control bus 440, governing data transfers between task data registers and the selected Processing Element and signals the Executive unit using bus 450 when such transfers are complete. In addition, the Resource Manager unit manages all PE control and data busses as well as the PE status bus 625, which signals the ready status of the Processing Element 600. In the preferred implementation, the PE control strobes are carried on PE control bus 550, a separate bus 560 carries function commands and data to the PE, and another separate bus 660 carries data and status information from the PE to the manager.

The data that flows from task data registers 160 to the Processing Element 600 flows through the Dataflow unit over bus 322 and hence over bus 522 to the Resource Manager unit and then bus 560 to the PE for processing. Results from the PE flow over bus 660 to the Resource Manager unit, then bus 522 to the Dataflow unit, and finally over bus 322 to the target task data register (not necessarily the same register from which the info came.) The data flows between Dataflow unit 300 and Resource Manager unit 500 are coordinated via control bus 525.

Note that the Processing Element may also have an I/O bus 680 connected to a Memory or 110 interface 690, for whatever purposes are appropriate. For example, search processes may load a specific phrase or other data element into the PE, as described above, and the PE may then use interface 690 to a data base repository to perform the search or sort.

Description of iMEM Operation

Such an implementation operate as follows, in one embodiment. The preferred iMEM implementation utilizes an external clock and reset line. Upon power-up the device is reset and appears to the CPU as a classical memory. In this mode the CPU can decide upon page size and page boundary (between task data and task code) and number of tasks, then write this information into the appropriate register/locations (103, 105, 107) on the system page, page 0 110, and then proceed to initialize the iMEM task pages by writing data to task data registers 160, code to task code space 165, and task state to task state registers 155, on a page by page basis 150/175. When memory has been thus prepared, the CPU can perform the 'wakeup' procedure, described later, to bring the iMEM into operation.

Figure 23A:
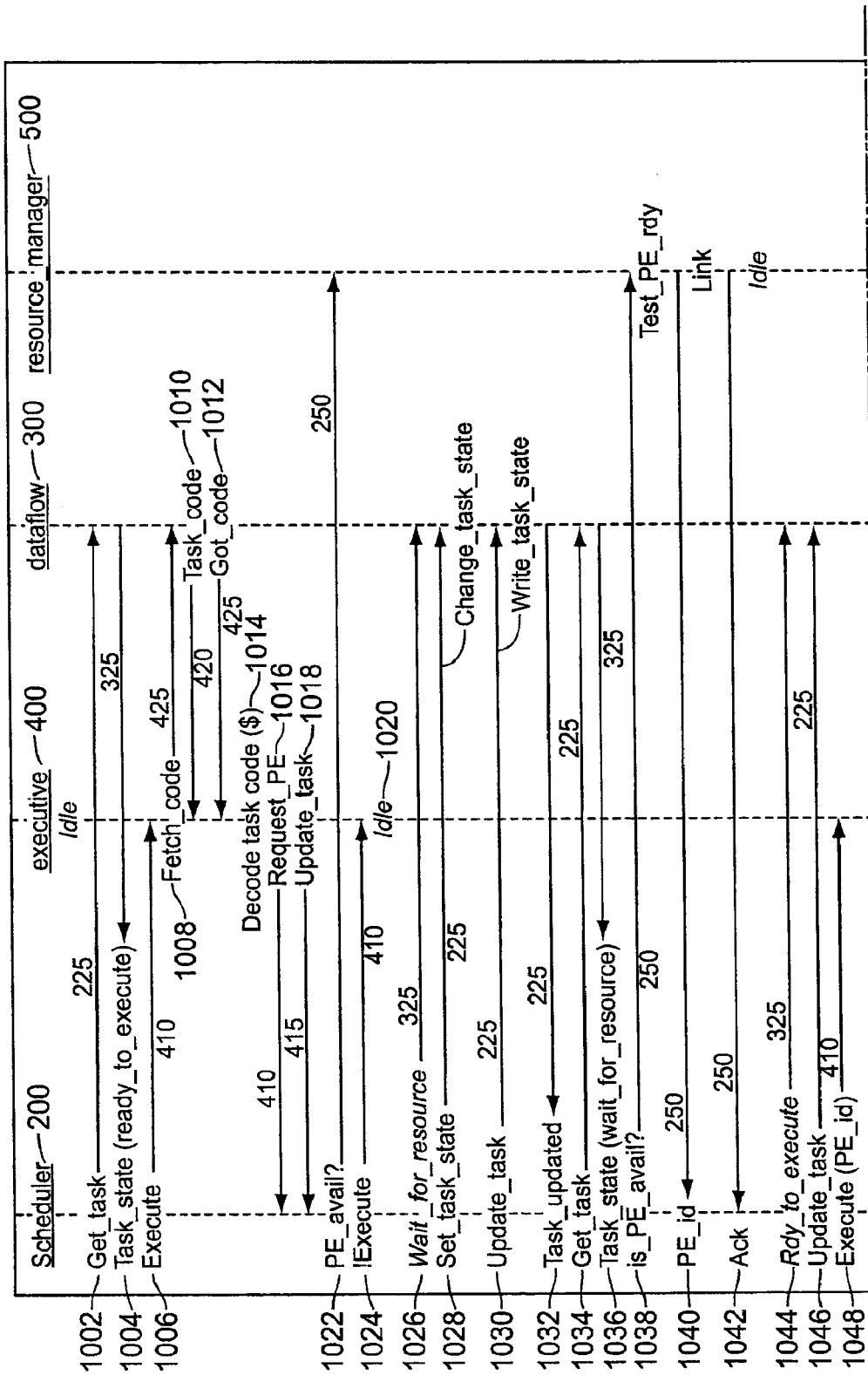
FIGS. 23A, B, C schematically shows the operation of a preferred embodiment.
Figure 23B:
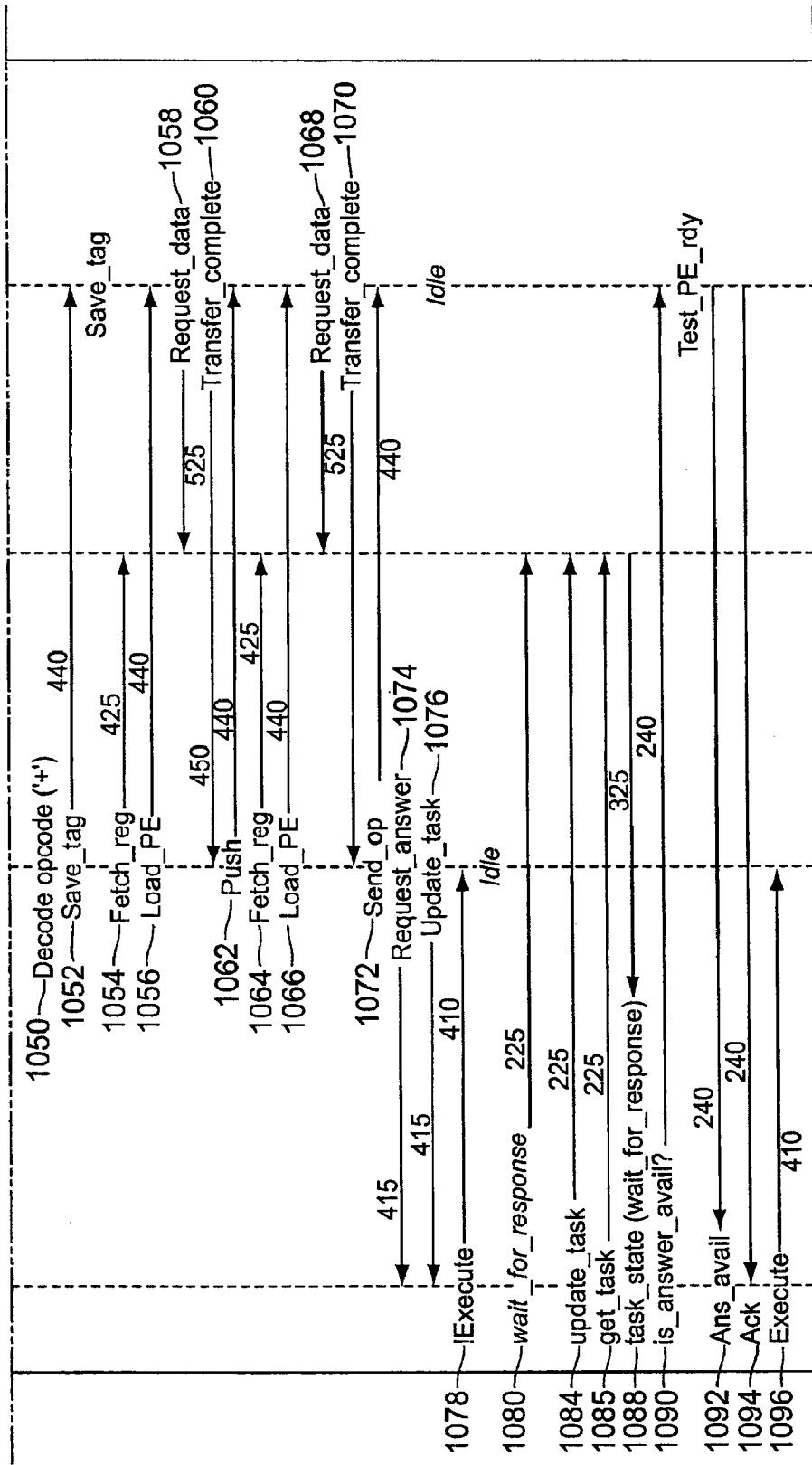
Figure 23C:
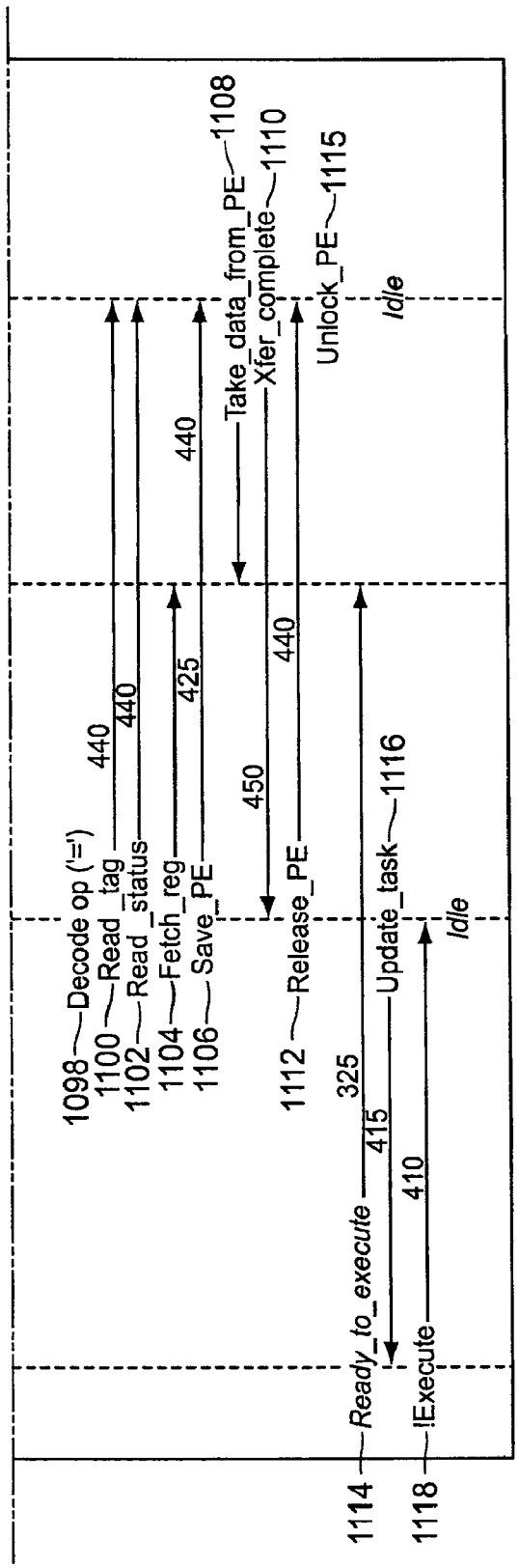

At this point the Scheduler unit 200 begins operating by zeroing the task select bus 220 and then asserting 'get task' 1002 of FIG. 23, which is a signal sent to the Dataflow unit over the task control bus 225. Upon receiving the 'get task' command, the Dataflow unit 300 begins fetching the task state from task 0, which is not a true task but is the system control/configuration page 110. This info is then used by the Scheduler unit to set the number of tasks present (unless pin strapped number of tasks is used) and, optionally, set the page size and boundary between task data and task code (boundary=start of task code.) The Scheduler unit then applies the number of tasks to the task select bus 220 of FIG. 3A, thereby selecting the page address of the 'last' task. (The task select bus is decremented down to zero, and when zero is reached, the task selection recycles to the 'last' task, unless another task scheduling algorithm is used.) With the task selection on bus 220 of FIG. 3A, the Scheduler unit again re-asserts 'get_task' signal 1002 of FIG. 23 over bus 225. The signal 'get_task' is cleared by handshake on bus 225 when task state is read by the Dataflow unit.

Upon detecting the 'get_task' signal from the Scheduler unit, the Dataflow unit applies the address of the first status byte to bus 320, and appropriate memory control signals (RD and CE) to bus 324 and reads the first byte of state information from the task state registers 155 via data bus 322. Sequential accesses read the remaining task state bytes 155 and stores these bytes in the working task state registers 330. The task state 1004 is conveyed to the Scheduler unit 200 via task info bus 325 and the Scheduler unit 200 interprets this information.

The Scheduler unit finds the task in one of the five valid states:
Interrupting
Suspended
Ready_to_execute
Wait_for_resource
Wait_for_response If the task state is Suspended, the Scheduler unit sequences to the next task, typically by decrementing the task select address 218 on 220 and issuing 'get_task' again to the Dataflow unit.

If the task state is Ready_to_execute, the Scheduler unit receives the 'task_PE' info over the task info bus 325, which indicates the Processing Element 600 in the PE array 675 that is currently linked to the task 150, if any. If this PE is zero, no PE is selected, otherwise, if the PE_ID 216 is non-zero, the appropriate selection address is applied to the PE select bus 210. At the same time the 'execute' signal 1006 is asserted to the Executive unit 400 via the task control bus 410.

The Executive unit begins in the 'idle' state and, in response to the 'execute' signal 2 1006, issues a 'fetch_Code' command 1008 to the Dataflow unit 300 over task control bus 425. The Dataflow unit 300 accesses the current task pointer from the working task state registers 330 and proceeds, via 320, 322, 324, to fetch the task code 1010 from task code space 165. This code is presented to the Executive unit 400 via bus 420 and the 'got_Code' signal 1012 is asserted by the Dataflow unit over bus 425. The Executive unit 400 then decodes the task code 1010 and takes the appropriate action. Because a major use of iMEM is to process task register data 160 using an appropriate Processing Element 600 (from PE array 675), a typical task begins by requesting a resource, indicated in the preferred implementation by ASCII task code '$' 1014.

When the Executive unit detects the 'request_resource' instruction ('$'), it asserts both the 'request_PE' signal 1016 to the Scheduler unit 200 via task control bus 410, and the 'update_task' signal 1018 to the Scheduler unit 200 via the resource request bus 415 and sets its own state to 'idle' 1020, awaiting the next execution event.

The Scheduler unit, upon detection of the 'request PE' signal 1016 from 410 issues a request, PE_avail? 1022 to the Resource Manager unit 500 via the 'PE_avail?' bus 250 and, upon detection of 'update_task' signal, performs the following:

The Scheduler unit de-asserts the 'execute' signal 1024 to the Executive unit 400, and signals the next state=Wait_for_resource 1026 to the Dataflow unit 300 via task info bus 325, while also asserting 'set_task_state' 1028 in the task control bus 225, causing the Dataflow unit to change the task state from Ready_to_execute to Wait_for_resource in the working state register file 330.

The Scheduler unit also passes the 'update_task' signal 1030 from the Executive unit to the Dataflow unit 300, via control bus 225, causing the Dataflow unit 300 to write the task state from working registers 330 to task state registers 155 in task 150 in memory 100, via Data flow busses 320, 322, 324.

The Scheduler unit then waits for 'task_updated' signal 1032 (on bus 225) from the Dataflow unit. When 'task_updated' 1032 is seen, the next task is selected via task select bus 220, and the 'get_task' signal 1034 again asserted on bus 225 to the Dataflow unit.

For ease of exposition, assume that the next task, fetched from the collection of tasks 175, is found to be in the Wait_for_resource state 1036. In this case the Scheduler unit does not assert 'execute' to the Executive unit but asserts the 'Is_PE_avail?' signal 1038 to the Resource Manager unit 500, via the PE_avail? bus 250, then wait for an acknowledgement from the Manager.

When the Resource Manager unit, which has been idle, detects the 'Is_PE_avail?' signal on bus 250, it tests the PE Ready signals on bus 625, and, if a PE is available, records this fact in Links 510 and responds with a positive assertion Ack 1042 on bus 250, otherwise, a negative assertion results on 250, and the Resource Manager unit returns to idle state.

If the Resource Manager unit found an available PE, then the identity of the PE, PE_id 1040 is returned to the Scheduler unit via 250 and the Resource Manager unit 'locks' the PE (using Links 510) to prevent any other task from acquiring this resource. The Resource Manager unit then returns to idle state and clears the 'availability' signals on bus 250.

When the Scheduler unit observes the acknowledgement Ack 1042 on bus 250, it determines whether the PE is available or not. If not, then the Scheduler unit uses bus 220 to select the next task from task set 175 and proceeds. If an available PE was found, the Scheduler unit sets the task state to Ready_to_execute 1044 ('update_task' 1046), asserts the 'execute' signal 1048 on task control bus 410, and also passes the PE identifier (PE_id), via task info bus 325 to the Dataflow unit, where it is written into working state registers 330, before the task state is updated in 155.

Because it was assumed that the task opcode '$' was encountered by the Executive unit, it is further assumed that, once the Wait_for_resource state returns to Ready_to_execute, the Executive unit finds an instruction that makes use of the requested resource. A realistic example would be the ASCII code sequence '+AB=C', which indicates that the addition operation '+' should be performed (in the PE) upon the contents of task registers 'A' and 'B' and the result, when available, transferred to register 'C'. We now describe the operations performed for this sequence of ASCII codes. Upon decoding the '+' opcode 1050, the Executive unit saves the operator and begins the following.

In the preferred implementation, the current task number, which appears on 220, is seen by the Resource Manager unit (not shown in FIG. 3 [but potentially transferred over 'PE_avail' bus]) and is used to 'tag' the PE with the task number. This is accomplished when the Executive unit issues a 'save_tag' signal 1052 over transfer control bus 440 to Resource Manager unit 500.

The Resource Manager unit then writes the 'save_tag' function via 560 to the PE using the PE control bus signal 550, followed by the 'task_select' value 220, which is written into the PE tag register 645, of the PE selected by bus 210, where bus 210 was setup by the Scheduler unit when the resource was found to be available (and also written to the working task state 330), so that the task has a record of which PE has been assigned and locked to it. As a result of the above operations, the task state contains the PE identifier, and the PE contains the task identifier, or tag. This linkage can be used for pre-emptive scheduling, error detection or any other purpose as appropriate. Note that the linkage is also contained in the Resource Manager unit 500 in links 510, where the lock is maintained.

Upon completion of the save_tag operation (or concurrently) the Executive unit 400 fetches the register name 'A' from task code space 165, by issuing a 'fetch_REG' signal 1054 to the Dataflow unit 300 via bus 425, then issues a 'load_PE' command 1056 to the Resource Manager unit 500 via the data transfer control bus 440. The Resource Manager unit 500 uses the Dataflow unit control bus 525 to request data 1058 for the PE, and, with handshaking on bus 525, expects data fetched from task data register 'A' in 160 by the Dataflow unit 300 to appear on data path 522 for writing to the PE via data bus 560 under control of signals on bus 550. The Resource Manager unit continues this operation until all data from Register 'A' has been loaded into the PE, either based on fixed data size or a data terminator.

Upon completion of the data transfer 1060, signaled to the Executive unit 400 over the transfer complete bus 450, the Executive unit 400 typically sends a 'Push' command 1062 over bus 440, which is sent to the PE via bus 560 and bus 550 to cause the PE to push the data just loaded onto the stack to make room for new data. When this transfer is complete as indicated by a signal on bus 450, the Executive unit 400 then begins the fetch of the next register name 'B' by means of fetch_reg 1064 from task code area 165 and the same load sequence, load_PE 1066, request_data 1068, transfer_complete 1070, as that for loading 'A' to the PE is repeated.

When both 'A' and 'B' have been loaded, the Executive unit retrieves the '+' operator, stored at the beginning of the sequence, and sends via 440 the '+' function using send_op 1072 to the PE via the Resource Manager unit 560 and 550. When the transfer is complete 450, the Executive unit asserts the 'request_Answer' signal 1074 to the Scheduler unit, via 415, and the 'update_task' signal 1076 via 415, and returns to the idle state.

The Scheduler unit, seeing the 'request_Answer' signal 1074 de-asserts 'execute' using the '!Execute' signal 1078 and sets the task state to Wait_for_Response 1080 via 325 where it is written to 330, and passes the 'update_task' signal 1084 to Dataflow via 225, thus causing the task state 155 to be saved for task 150. The Scheduler unit then causes the next task to be selected using the get_task signal 1086. The response is the task_state ('wait_for_response') 1088 from the dataflow unit 300.

When the above task, or another task waiting for an answer, is next detected, the Scheduler unit asserts the 'is_Answer_avail?' signal 1090 over bus 240 to the Resource Manager unit 500, which, having recorded the linkage 510 between the requesting task (currently task selected 220) and the assigned PE, tests the relevant PE Ready signal 625 from the PE array 675, and responds 'yes' or 'no' via bus 240 based on whether the PE is ready with an answer or not.

If the answer is not ready, the Scheduler unit advances to the next task. If the answer is ready as indicated by 'ans_avail' 1092, the Scheduler unit asserts the 'execute' signal 1094 to the Executive unit 400 and changes the task state in 330 to Ready_to_execute 1114 via task info bus 325. After the Execute Unit is finished, the task state is updated by 'update_task' 1116 and the '!Execute signal' 1118 is issued to the Executive unit 400.

The Executive unit 400, fetching the next task code as usual, detects the '=' code 1098, and asserts (in the preferred implementation) a 'read_tag' signal 1100 on bus 440 to the Resource Manager unit 500, which proceeds, via 560, 660, 550 to read the tag 645 using 'read_tag' 1100, from PE 600, serving at a minimum as a check on linkage, then Executive unit 400 asserts 'read_status' 1102 via bus 440, causing the Resource Manager unit 500 to read the PE status information 648 (again via 560, 660 and 550). This status information can contain PE ready status, error status, equality or comparison status, or other, as appropriate to the particular PEs (although heterogeneous PEs should strive for identical status format, if feasible.)

Assuming that no error occurred and that the desired result was not simply the status of the operation ('>', '=', '<') but the resultant data, the Executive unit 400 again issues the 'fetch_reg' command 1102 to the Dataflow unit 300 to obtain the target register ('C') from task code, then issues the 'save_PE' command 1106 via bus 440 to the Resource Manager unit 500.

Upon detection of the 'save_PE' signal 1106 (inverse of 'load_PE'), the Resource Manager unit 500 reads the answer (assumed at the top of stack in the PE) from the PE and places the data (or the first byte thereof) on data path 522, while issuing a 'take_data_from_PE' signal 1108 to the Dataflow unit 300 via data flow control bus 525. The Dataflow unit 300, using register name 'C', computes the address of the target data register and writes the data into task data space, handshaking with the Resource Manager unit 500. This operation continues until all of the answer data has been transferred from the PE result stack 620 to the target register 160, then the Resource Manager unit 500 signals 'transfer_complete' signal 1110 via bus 450 to the Executive unit 400, which asserts the 'release_PE' signal 1112 via bus 440 to the Resource Manager unit 500, and the 'update_task' signal 410 to the Scheduler unit.

When the Resource Manager unit detects the 'release_PE' signal 1112, it 'unlocks' the PE 1115, that is, removes the association of the current PE with the current task (in Links 510), thus effectively returning the PE to the pool of 'available' PEs.

Thus, we have executed the ASCII task code '$+AB=C' in the iMEM architecture.

Although iMEM supports far more functionality than described above, the operations described are typical of interactions between Scheduler, Executive, Dataflow, and Resource Manager units and corresponding access to memory and Processing Elements. Other operations, such as 'copy data from task code space to task data register' or 'signal CPU via IRQ 126 and Suspend task' can be seen to be compatible with the above described operation, and implementable by one skilled in the art. To copy data from task code space to task data space involves the Executive and the Dataflow units, independently of the Resource Manager unit. In the same manner, a task code execution may involve only the Executive unit and Resource Manager unit (after the task code fetch completed) such as 'initialize a PE' or 'request PE internal function', etc. Finally, a suspended task is ignored by the Scheduler unit, thereby allowing the CPU to access the task's data and/or code space. After the desired access has been completed, the CPU can modify the task state 155, typically setting the task state from Suspended to Ready_to_execute, at which point the Scheduler unit would once again begin scheduling the task. Note that, even if the task state modification collided with the task state access by the Scheduler unit, such that the CPU made the task Ready_to_execute immediately after the Suspended state was read, the Scheduler unit does not update the task state, thereby preserving the ready state until the next 'pass', as is normal for Ready tasks waiting to execute. FIG. 23 schematically shows the above operation with unnecessary redundancy removed.

Figure 24:
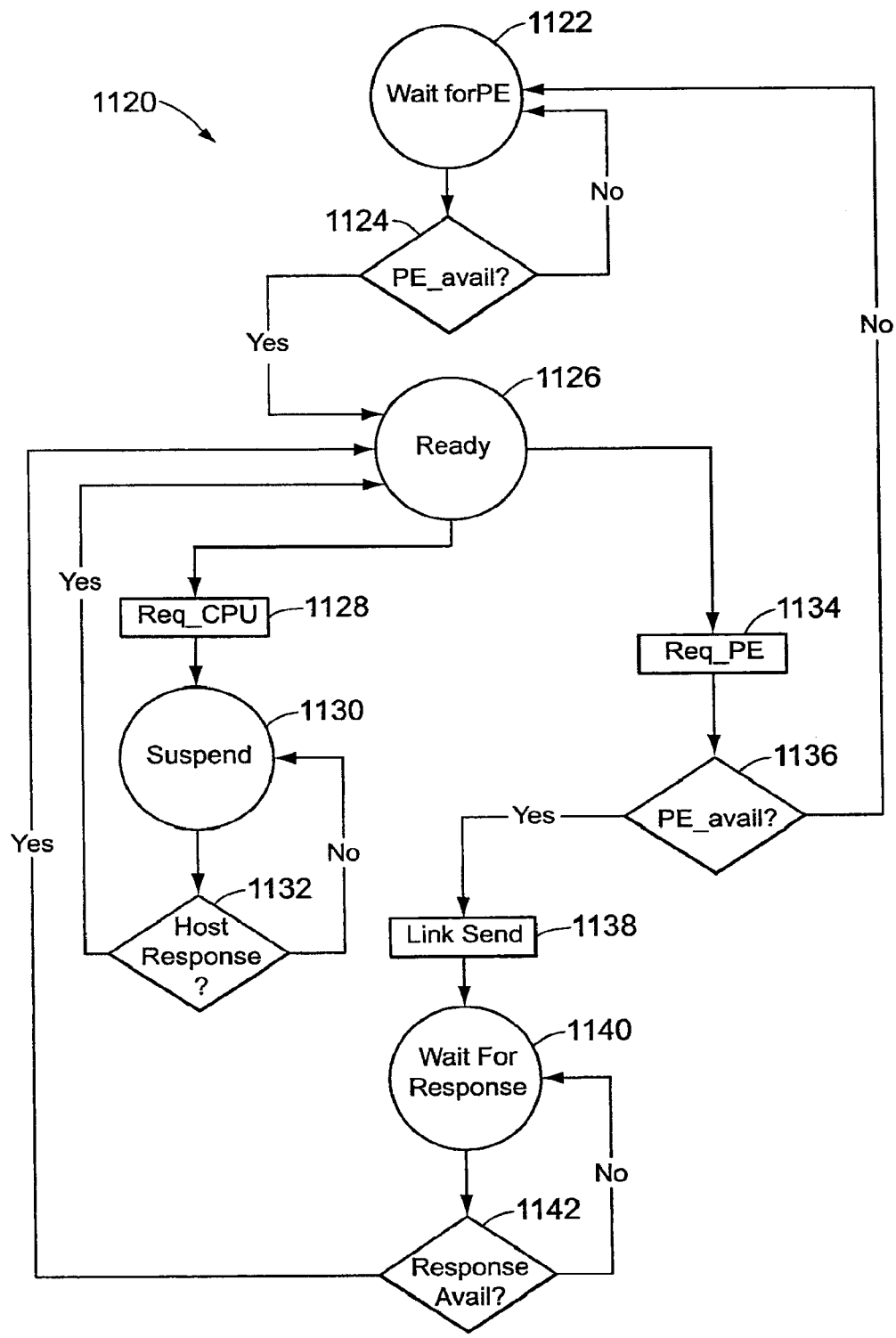
FIG. 24 shows a flow chart of the basic state transitions.

FIG. 24 shows a flow chart of the basic state transitions of iMEM. In steps 1122 and 1124, the iMEM waits for a Processing Element (PE) to become available. If a PE is available, the state of iMEM goes to ready, in step 1126. In this state, if iMEM needs to communicate with the host CPU in step 1128, it does so and suspends itself in step 1130, waiting for a response, as determined in step 1132. Otherwise, iMEM requests a processing element, in step 1134, and checks for its availability, in step 1136. If a PE is available, a link is sent to the PE in step 1138, and iMEM waits for a response from the PE, in steps 1140 and 1142. When a response is received, iMEM returns to the ready state.

Brief Summary of iMEM Operation

The Scheduler unit selects a task/page and signals the Dataflow unit to get the task. If the task is READY, then Scheduler unit signals Execution to execute the task code.

The Executive unit encounters a wait-for-resource instruction (via Data-flow) and signals a resource request to the Resource Manager unit, through the Scheduler unit.

If no resource is available, Scheduler unit sets the task state to Wait_for_resource.

Otherwise, the Resource Manager unit (eventually) finds an available PE and signals such.

The Executive unit issues a "LINK & LOCK" command to Resource Manager unit or Dataflow units, (or both).

The Resource Manager unit "tags" or links the PE to the task by writing the current task page to the PE (which stores the tag/link) and sets a "lock" bit or flag, maintained by the Resource Manager unit to prevent said PE appearing available to another task.

The Dataflow unit, under control of Resource Manager unit, transfers task data to PE (or from task code to data register under control of Executive unit).

The Scheduler unit, in coordination with other units, commands Dataflow unit to set task state to Wait-for-Answer and update task in RAM.

The Scheduler unit then advances, via appropriate algorithms, to the next task. Eventually, the "next task" is a task waiting for an answer.

The Scheduler unit asks the Resource Manager unit if answer-is-available. If not, the task continues to wait.

If so, the Resource Manager unit manages the transfer of data from the Processing Element, PE, to the task data space in RAM, then signals the Executive unit that the data transfer is complete.

The Executive unit tells the Resource Manager unit to release the resource (the PE) and the Scheduler unit to update the task state (to READY). The PE returns to the "available" pool and task processing continues as appropriate.

Figure 5:
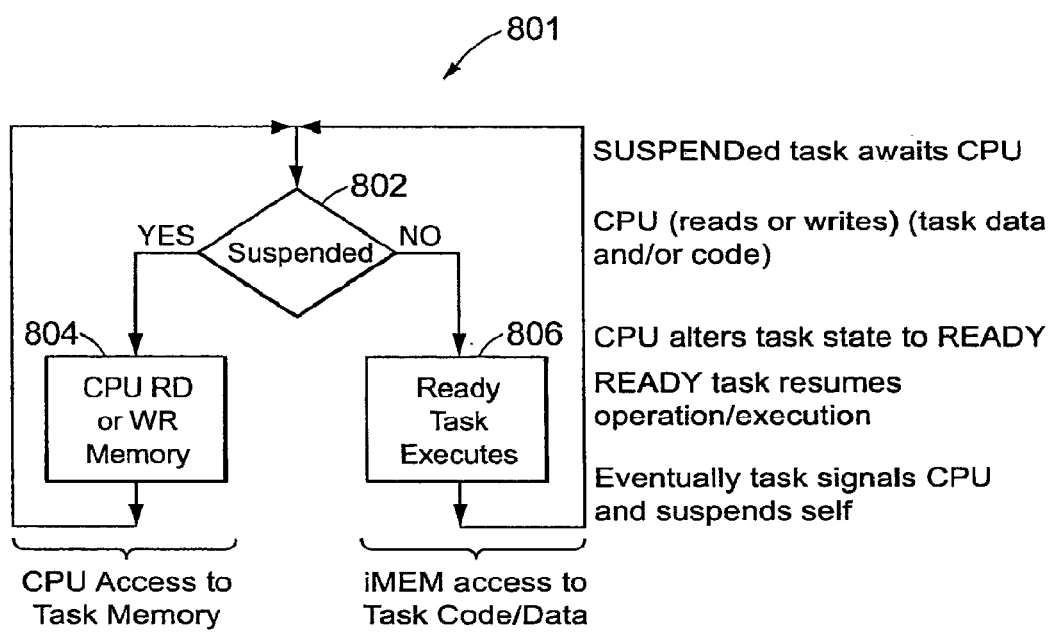
FIG. 5 shows a suspended task being accessed by the host CPU. If not suspended, the task executes and waits for resources and responses.

The number of task instructions executed before the task is returned to READY state is implementation dependent and should best match the implementation to the problem. In most cases it is assumed that, at some point, a task may reach a state where it is appropriate to provide some result to the host CPU. The preferred implementation signals the CPU, typically through an interrupt line, and enters the SUSPENDed state 802, awaiting CPU response, although in some cases it may be appropriate for task execution to continue. In general, CPU/iMEM interaction is coordinated as follows (see FIG. 5):

SUSPENDed task awaits CPU
CPU (reads or writes) (task data and/or code) 804
CPU alters task state to READY
READY task resumes operation/execution 806
Eventually task signals CPU and suspends itself iMEM Architecture is Both Task Code and Task Data Independent iMEM architecture can be tailored to a specific application class. The iMEM architecture described above is independent of task code and data implementations. The specific instruction coding (interpreted by the Executive unit) and the specific data types and sizes do not affect the general iMEM operation described above (except to simplify implementation.) For this reason task code and data implementations may be problem specific. Although some problems may be optimally solved via such specificity in (task instruction and data) encoding, we specify a preferred iMEM encoding scheme that should be employed unless other considerations suggest otherwise.

The iMEM operations described above are extremely general, that is, tasks execute and change state according to the events occurring during execution, and data is transferred from task memory to Processing Elements and operations performed, then the results are transferred into task memory space. Thus, a generic encoding of task operations is both possible and desirable.

Description of iMEM ASCII Task Code

The preferred task encoding is ASCII, that is, task instructions are represented by ASCII codes, including ASCII arithmetic codes, +, −, /, as well as punctuation and other ASCII symbols. The preferred data structure is Register-based, and uses ASCII Register names, 'A' . . . 'Z'.

Figure 6:
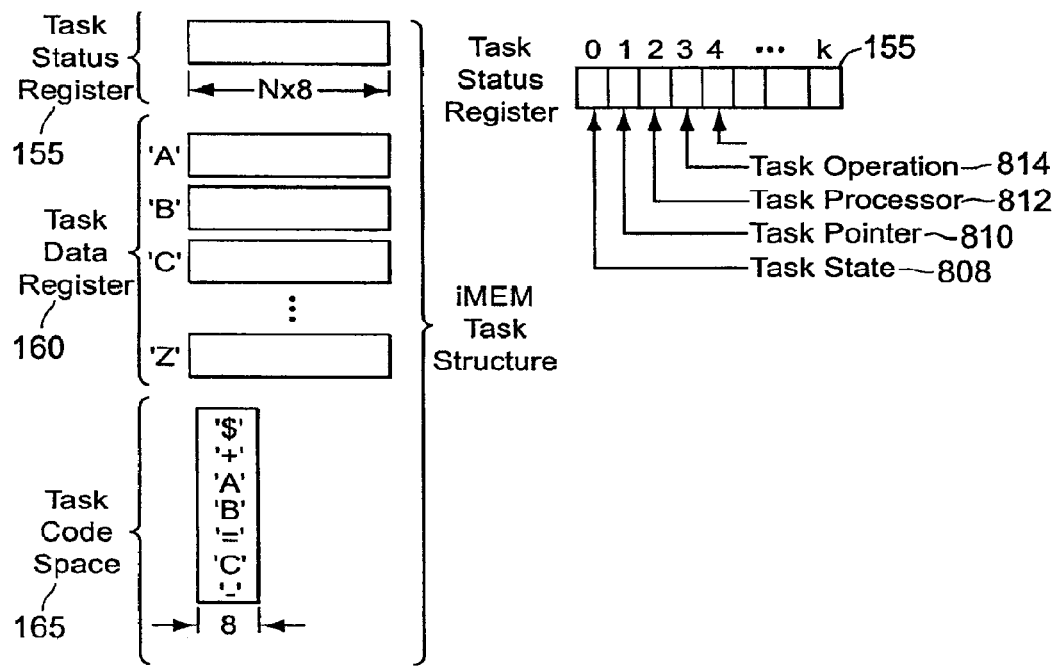
FIG. 6 shows ASCII iMEM Task Coding Structure.

Though this naming convention implies that we have a maximum of 26 data registers (per task), it is consistent with the goals of the iMEM architecture. The ability to refer to task data registers by an ASCII name is so powerful that limiting the register set to 26 data registers per task is acceptable. A typical iMEM application is a many-body problem, typically one body per task. Such bodies can usually be characterized by fewer than 26 parameters so that this limitation should not be unduly constraining. If it is, we can double register space by making the register name case sensitive. Even with 26 registers (per task), the iMEM has a larger register set than most classical and many current CPUs. This task structure is shown in FIG. 6, which depicts a field for the task state 808, a task pointer 810, a task processor 812, and a task operation 814. Preferred implementations use byte wide (8-bit) task code memory, which is compatible with and accessible by most CPUs. The width of the data registers is completely unspecified, but is typically a multiple of 8 bits.

Note that the ASCII-named registers may contain the data to be operated on, or may contain pointers to the data to be operated on, or both.

Consider a typical ASCII encoded task instruction:

'$+AB=C' (or '$A+B=C')

The above instruction is decoded by the iMEM Executive unit as follows:

| | |
|---|---|
| '$' | => wait for resource |
| '+' | => add the two following registers |
| 'A' | => send 1st Register to PE |
| 'B' | => send 2nd Register to PE |
| '=' | => wait for answer, transfer results |
| 'C' | => Register for result storage |
| ' ' | => ignore spaces, used for readability |

Other task code instruction(s):

| | |
|---|---|
| :B-123.456 | //copy '-123.456' into Register B |
| $(A>B) ? g : h | // compare Register A to Register B, do g if >, else do h |
| % | // suspend self, wait host intervention (assert IRQ) |
| 0 | // End of task code, repeat from start of task code |

| | |
|---|---|
| * + − / > < & \| . ~ _ | ASCII Data Processing Operators |
| ! ` : $ = ? # % @ ; \ " ^ , | ASCII System Operators |
| [ ] ( ) { } | ASCII Partition Operators |
| 0 1 2 3 4 5 6 7 8 9 | ASCII Numeric data |
| A B C . . . X Y Z | ASCII Register names |
| a b c d e f g | ASCII Function names |
| h i j k I m n o | ASCII Index Register names |
| p q r s t u v w x y z | ASCII Reserved symbols |
| 0x01 . . . 0x1A | ASCII Ctrl Operators | iMEM ASCII Data Processing

The ASCII task encoding scheme described above is data independent, if one assumes that the host loads the data registers initially, and then unloads them directly, and if the Dataflow unit, Resource Manager unit, and PE elements are implemented appropriately.

Thus, iMEM works, as described, with ASCII task code and binary data, but also works with ASCII data, given the same qualifications. For some tasks, such as search and sort, ASCII data is most appropriate. In other cases, such as numeric processing it is harder to determine the appropriate data format/encoding. For example, stock market prices are typically entered as ASCII numbers and displayed as ASCII numbers. Even if the binary computation is faster than ASCII computation, the overall computation speed may be slower when ASCII-to-binary-to-ASCII translation overhead is considered. There are also silicon or equivalent costs involved. For typical floating point units of the type found in Intel Pentium CPUs, the data is 80 bits wide, and paths in the FPU are 80-bits wide. For ASCII floating point units the internal paths are only four bits wide, allowing more effective use of silicon. Thus, for example, Intel CPUs typically contain one to four FPUs, while initial FPGA-based iMEM devices contain up to twenty-five ASCII FPUs.

Although our preferred implementation uses ASCII data and data processing, there is nothing about the iMEM architecture requiring such, or precluding Unicode implementation.

iMEM ASCII Architecture

As described above, iMEM architecture supports both binary data and code. The preferred implementation assigns upper case ASCII alphabetic characters as register names, and assigns ASCII operators (+, −, *, /, _, >, <, ?, !, @, #, $, etc.:, as opcodes. Because there are innumerable problems to solve, and only a finite number of ASCII operators, iMEM specifies a preferred operator assignment, but specific problems may be better served with an alternate assignment, therefore there is no strict insistence on a particular operator interpretation in the iMEM architecture. For example, the "+" sign should typically cause addition to be performed in arithmetic systems, but could mean concatenations in sorting applications.

| +AB = C | +AB = C | +BA = C |
|---|---|---|
| A = 123 | A = "cat" | A = "cat" |
| B = 456 | B = "dog" | B = "dog" |
| C = 579 | C = "catdog" | C = "dogcat" |

Note that the arithmetic+operation is commutative, while the alphabetic operation is not. Note also that the implementation of the Executive unit is the same for both arithmetic and alphabetic operations but the Processing Element performs the operations differently, as would be expected for a computation Processing Element versus a sorting element. The preferred iMEM implementation of ASCII operations preserves to the maximum extent, the behavior of the Execution, Scheduler unit, Dataflow, and Resource Manager units and expects the Processing Element(s) to interpret the operations appropriately. With this understanding of iMEM ASCII operators, we define a default set of operations.

The default set of ASCII operators is further partitioned into two sets of operators. Operators in the first set are interpreted by the Executive unit, while operators in the second set are interpreted by the Processing Element. For example, the description of iMEM operation described in detail the interpretation of the following instruction, $+AB=C.

In the example, the "$" is interpreted by the Executive unit as a request for resource operation. Then, the "+" was recognized as requiring at least two register operands, but was sent to the Processing Element for actual interpretation and execution. The "=" operator was interpreted by the Executive unit as a transfer operator, and the result of the "+" operator was transferred from the Processing Element to the target register, C.

In the simplest iMEM architecture the following operators are sent to a Processing Element for interpretation:

| <OPR> | <Default interpretation> |
|---|---|
| + | Add, concatenation |
| − | Sub, difference |
| * | Mul, product |
| / | Div, partition |
| > | GT, greater than |
| < | LT, less than |
| . | Decimal Point |
| & | And, subset |
| \ | Or, subset |
| ~ | Not, outset |
| { } | Reserved |
| _ | Reserved |

The following operators are interpreted by the Executive unit:

| <OPR> | <Default interpretation> |
|---|---|
| $ | Request Resource |
| # | Hexadecimal :k #75 |
| % | Request Host and Suspend |
| = | Transfer result to register |
| ? | Test for Branch |
| @ | Call register or branch indirect |
| : | Location operator |
| ; | Pass through operator (to PE) |
| " | String delimiter (overrides space, etc.) |
| ( ) | Scope operators |
| [ ] | Index operators |
| \ | Reserved |
| ; | Delimit instructions, switch task (this task = READY) |
| ! | Interrupt host or send I/O output |
| , | Separator |
| ^ | Ctrl, ^A send task code = 01 to Executive unit |

Finally, the preferred iMEM implementation also interprets multi-character operations.

iMEM Index Registers

Figure 7:
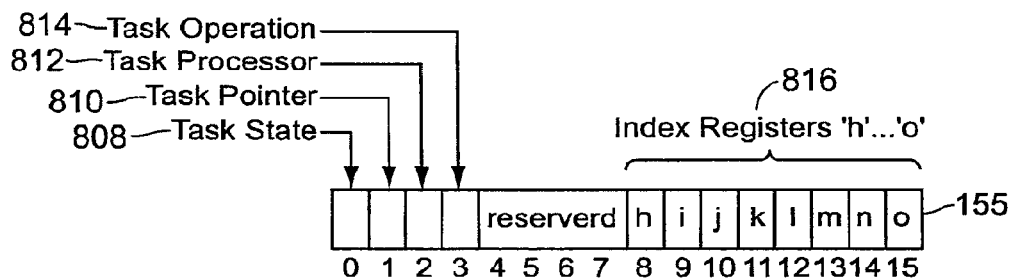
FIG. 7. shows each task status register containing eight default index registers. The index registers are represented in ASCII code by 'h' . . . 'o'.

In the preferred implementation, the ASCII-named data registers hold data sent to or received from the Processing Elements. In addition to these primary data registers, we implement binary index registers and assign lower case ASCII names to them. The default set of byte-wide binary index registers 816 labeled 'h' . . . 'o' are included in the task status registers as shown in FIG. 7. Multi-byte-wide index registers are consistent with this scheme.

Index Registers can be initialized, incremented, decremented, and tested, and can be used to index data registers by task and to index into code space for branching. Examples of index register usage are shown:

| | |
|---|---|
| :n #04 | // load index register n with hexadecimal value 04 |
| n+ | // increment index register n |
| n− | // decrement index register n |
| k: $+AB = C | // k is label, index register k loaded with task ptr.-> "$" |
| @k | // k is branch target, copy index register k into task ptr. | iMEM Register Index Addressing

The addition of index registers supports 'branch to label' operation as described above, and also opens the possibility of data register indexing. In the preferred implementation, the following syntax represents such indexing:

A[n]//n is task/page index for data register A

The interpretation of A[n] is that 'n' declares the task from which register 'A' is accessed.

| | |
|---|---|
| $+AB = C | // wait resource, add A and B, wait response, transfer to C |
| $+A . . . F = G | // wait resource, sum A through F, wait result, transfer to G |
| $+A[i]B[j] = C[k] | // wait resource, add A from task i to B from task j, wait result, transfer to C of task k. |

In each of the above expressions, the system operator "$" causes the system to wait for an available Processing Element, then to fetch the data operands from the relevant named data registers, send these operands to the Processing Element, and tell the Processing Element to perform the data operation "+". It is significant that no assumptions have been made about the nature of the data operands, or the nature of the "+" operation. The system is assumed to be able to fetch data from named data registers, and copy results to a named register, and the Processing Element is assumed to be able to perform the "+" operation. It does not matter whether an arithmetic operation is performed on binary data, or on ASCII decimal data or whether concatenation is performed on ASCII data strings, the iMEM systems behave in essentially the same manner.

Figure 8:
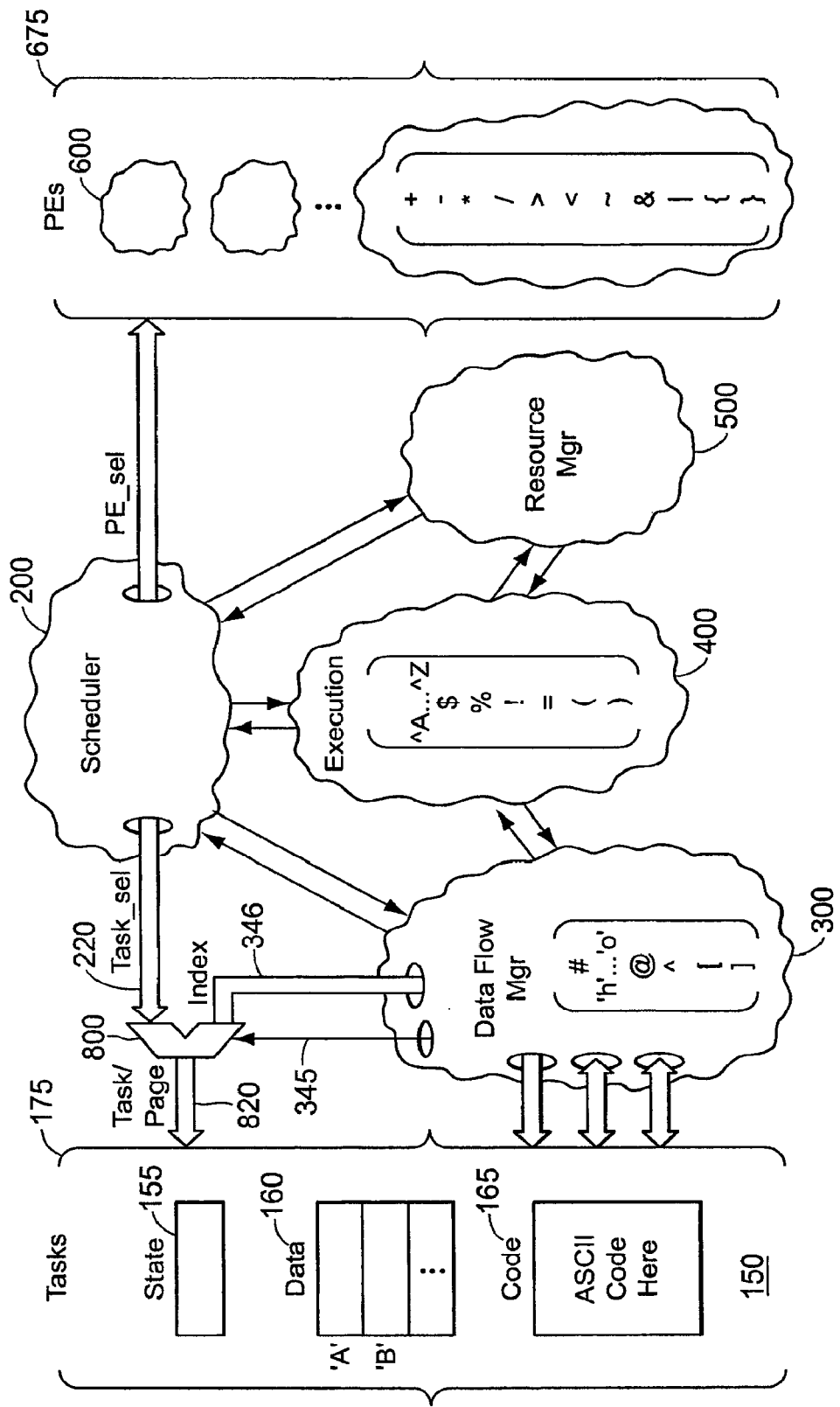
FIG. 8 illustrates the iMEM distributed ASCII interpretation architecture preferred for indexed addressing operations and additional hardware support for such index-related page addressing. Data flow paths between task memory and Processing Elements are not shown.

Because all tasks share the same register structure, addressable by alphabetic characters 'A' through 'Z', the same letter can refer to the same register on all pages, and the index register allows the actual task/page from which the register is to be accessed to be specified. In order to accomplish this type of indexing, there needs to be a mechanism that can alter the 'page' address 820 during the access, then restore the current task page address for continued task code execution. Such a mechanism is shown in FIG. 8. In this implementation, the indexed page address 346 is sent from the Dataflow unit 300 and multiplexed by multiplexer 800, under Dataflow unit control signal 345, with the system page address provided by the Scheduler unit 200.

An alternative use of indexed addressing could be used to select a particular Processing Element as follows:

$[n]+AB=C wait for resource n, add A and B, wait response, transfer to C

In this case, the $ resource request is immediately followed by an index operation specifying the address of the Processing Element desired. (Alternatively, control characters can address PEs.) This assumes heterogeneous elements and is generally unnecessary for homogeneous Processing Elements. Because the preferred implementation uses homogeneous elements, we assume such in the following. Excluding the case of indexed Processing Element addressing, the register indexed addressing can be interpreted in the Dataflow unit, per se. The advantage of such interpretation is that there is no necessary flow between task code memory, the Dataflow unit, the Execution system, and back to the Dataflow unit, all of which takes time, measured in clock cycles.

Performing register indexing in the Dataflow unit allows much faster operation than would the same interpretation in the Execution system, and leads us to consider what other operations can or should be performed in the Dataflow unit. One such operation is the hexadecimal numeric operator, which follows an index register specifier and precedes numeric value to be stored in said index register. As described above, :n#03 is interpreted to mean that index register n is to be loaded with hexadecimal value 03, which produces the value 00000011 and stores it in index register n. The interpretation of each of the ASCII characters in this sequence can be performed by the Dataflow unit, again avoiding the necessary handshaking between the Dataflow and Execution subsystems, and thereby speeding up the process considerably. Note that, except for the simple hex-to-binary conversion, the necessary operations are all addressing and data access operations, and therefore properly belong in the Dataflow unit. With this in mind, we also examine the operations associated with using index registers to hold label addresses, and with subsequent use of such to facilitate branching in task code. For task code spaces of 256 bytes or less, the label address itself can be stored in the index register, while for larger task code spaces, relative addressing is preferred, unless the default memory width is greater than 8 bits, in which case absolute addressing may be preferred. In any case, these addressing operations are fetched from memory by the Dataflow unit, the relevant index register and task code addresses computed, and either the relevant task code address is stored in the specified index register, for labels, or the contents of the specified index register (the branch target in @n) is accessed, and copied into the working task pointer register, for branching operations. These addressing manipulations, accesses, and modifications are all naturally performed in the Dataflow unit, with no necessary help or intervention from the Execution system.

Distributed ASCII Operator Interpretation

The consequence of the above description is as follows. We earlier specified a two set ASCII code interpretation mechanism, in which some ASCII codes were interpreted by the Execution subsystem, and some were sent to the Processing Element subsystem to be interpreted. If we add the index register based operations described above, we see that a better implementation is the novel three partition distributed ASCII code interpretation just seen. In this scheme, we include the Ctrl operator, ^, which operates on capital ASCII alphabetic characters, ANDing the letter with 10111111 to clear the 6th bit, producing a result from 0x01 to 0x1A, denoted by Ctrl-A through Ctrl-Z, which operators are to be interpreted by the Execution subsystem in the preferred implementation. However, we see that the compaction of the two ASCII characters can be performed in the Dataflow unit, which now recognizes the ^ character, fetches the next alphabetic character, clears bit 6, and sends the resultant Ctrl character to the Execution system to be interpreted.

The three operator sets for distributed ASCII code processing are summarized. In the preferred iMEM architecture the following operators are sent to a Processing Element for interpretation:

| <Operator> | <Default interpretation> |
|---|---|
| + | Add, concatenation |
| − | Sub, difference |
| * | Mul, product |
| / | Div, partition |
| > | GT, greater than |
| < | LT, less than Decimal point |
| & | And, subset |
| \| | Or, superset |
| ~ | Not, outset |
| { } | Reserved |
| _ | Reserved (underscore) |

The following operators are interpreted by the Executive unit:

| <Operator> | <Default interpretation> |
|---|---|
| $ | Request resource |
| % | Request host and suspend |
| = | Transfer result to register |
| ? | Test for branch |
| ; | Location operator followed by data register specifier |
|   | Pass through operator (to PE). |
| " | String delimiter (overrides space, etc.) |
| ( ) | Scope operators |
| \ | Reserved |
| ; | Delimit instructions, switch task (this task = READY) |
| ! | Interrupt host or send I/O output |
| , | Separator |

The following operators are interpreted by the Dataflow unit:

| <Operator> | <Default interpretation> |
|---|---|
| 'h' . . . 'o' | Index register specifiers |
| [ ] | Index operators |
| # | Hexadecimal :k #75 or :A#75FE32 etc |
| ^ | Ctrl, ^A sends task code = 01 to Executive unit (^B = 02, etc) |
| @ | branch indirect through index register |
| : | Location operator followed by index register specifier |

The processing of all ASCII operators, both system and data operations should be executed in the same way over all preferred implementations. The scheme is illustrated in FIG. 8, in which ASCII operators are shown in the subsystem in which they are interpreted. iMEM architecture is compatible with any number of ASCII mappings. For instance, in the above example the characters '<', '>' are interpreted by the computational Processing Element as less than and greater than. Another implementation could treat '<' and '>' as XML delimiters to be interpreted by either the Execution subsystem or the Processing Element, etc.

Note also that the 'Pass-through' operator can be either "command by command" or toggle, that is, the pass-through operator can cause one command to be sent to the current PE, or can cause all following commands to be sent to the PE until the next pass-through operator toggles the pass-through mode, returning control to normal execution/interpretation mechanisms. In this way, the iMEM architecture can effectively support multiple "languages," wherein each separate language is addressed to an appropriate Processing Element.

ASCII iMEM Data Independence

As discussed above, the use of ASCII task codes and ASCII Register names, does not require the use of ASCII data, but is compatible with almost any data type, from ASCII numeric to binary numeric to image maps (.BMP, etc.), voice waveforms, etc., assuming that the data registers have appropriate capacity. In preferred implementations, task data registers are 16 bytes long, but they could easily be one, two, four, or eight bytes long, or much longer. Register size can be implementation specific, or can be specified as part of the task state info for each task.

In addition to register size, the task page size and the boundary between task data and task code (=start of task code) can be variable, and included in the task state info for each task. Although the preferred implementation uses fixed size pages, allowing the Scheduler unit to 'randomly access' tasks, variable page sizes could be supported by the Scheduler unit following links from the current task to the 'next' task, using the page info in the task state to compute the end of the current task and the start of the next. If 'random-like access' is required, the Scheduler unit can build a task address table as each new task is encountered, thus allowing access to any (already encountered) task regardless of varying task sizes.

Figure 9:
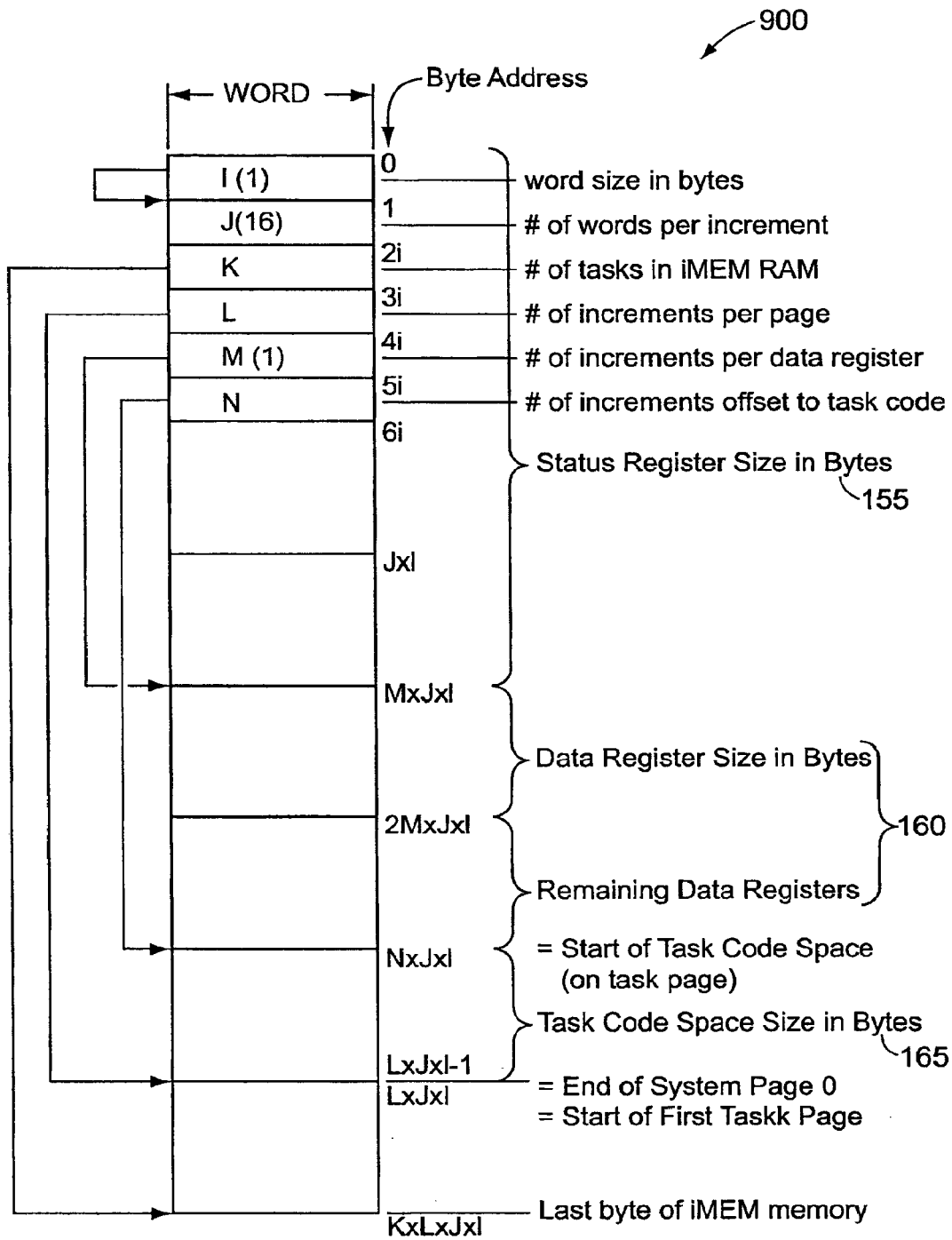
FIG. 9 shows the iMEM configuration parameters on system page.

In addition to task state, task data, and task code segments on each page, iMEM can support other segments such as symbol table, stack storage, or object template segments, etc. The preferred mechanism for supporting additional segments is by extension to the list of pointers and counters as shown in FIG. 9. FIG. 9 shows the page 0/system page. If segments are sequential, then successive sizes are sufficient to define numerous segments per task. With fixed page size, these configuration parameters I, J, K, L, M, and N are located on the system page 900, where I is the word size in bytes, J is the number of words per increment, K is the number of tasks in the iMEM, L is the number of increments per page, M is the number of increments per data register, and N is the number of increments offset to the task code. Note that for one gigabyte of RAM and a page size of 4K bytes, the Scheduler unit can support approximately 250,000 tasks. Conversely, for pages of 256K bytes, the Scheduler unit could support 4K tasks. It can be seen that the fixed page size, system-page-based configuration parameter table is indefinitely flexible.

iMEM Data Path Width and Unicode Implementations

Because the iMEM configuration is defined via specific parameters on the system page, these parameters can by redefined and iMEM reconfigured by host CPU software. A major architectural question having to do with such dynamic reconfiguration concerns the basic data path width. If the path width varies, there must be corresponding variation in the memory, the Dataflow unit, the Resource Manager unit, and the Processing Elements, whereas if the data path is constrained to a fixed word size, with only the number of words variable, then changes in iMEM are confined to the Processing Elements, with few, if any, changes required in memory, data-flow, or Resource Manager unit circuitry. Note that a byte wide path quite naturally supports any ASCII data types, while also supporting 8-, 16-, 32-, 64-, or N-byte binary data types. Although the sequential handling of byte-wide data consumes greater time than wider paths, the silicon (or other substrate) requirements are less, so it may be feasible to trade-off data flow speed for compensating gains in the number of tasks and/or Processing Elements. The preferred iMEM implementation therefore uses byte wide data paths, but any width data path is compatible with iMEM, as long as all data handling circuits are implemented appropriately. Note also that a 16-bit memory and data path width supports Unicode data and instructions in the same natural manner that the 8-bit architecture supports ASCII coding. Thus, a preferred 16-bit architecture is Unicode-based with all ASCII operations preserved from the preferred 8-bit implementation. The same data independence applies to Unicode implementations as to ASCII implementations.

Alternative Dataflow Organization

The iMEM architecture described above uses the Dataflow unit to handle addresses to memory, memory control signals and memory data access, and presents the data to the Resource Manager unit, with handshaking.

Figure 10:
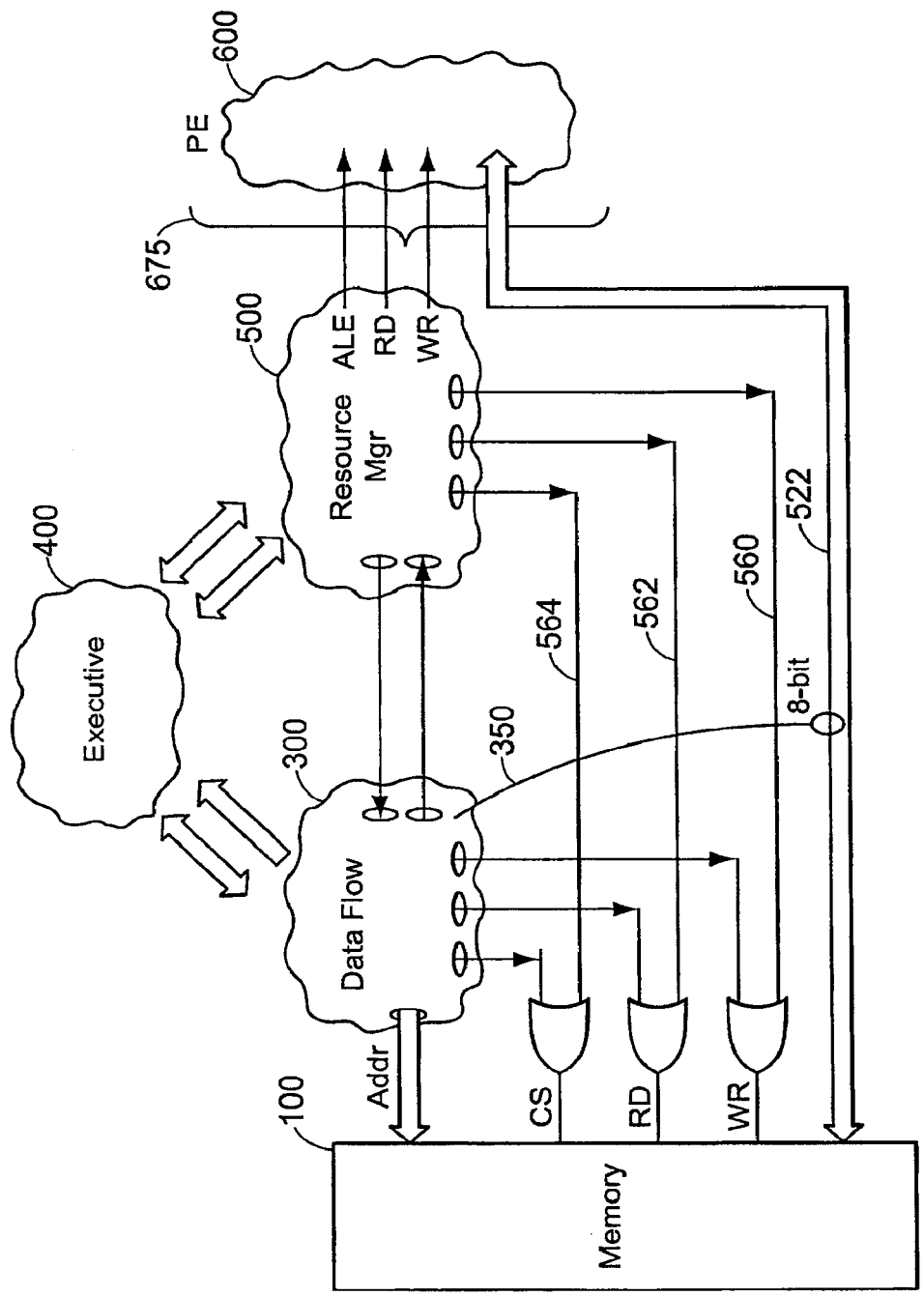
FIG. 10 shows an alternative iMEM data path between memory and Processing Element that preserves iMEM task scheduling and execution architecture, while supporting appropriate data size.

An alternative memory access mechanism involves the Resource Manager unit signaling the Dataflow unit to supply the relevant address to memory while the Resource Manager unit takes control of the memory control signals 560, 562, 564 and data bus 522, as shown in FIG. 10. In the preferred implementation the Dataflow unit 300 maintains byte-wide access 350 to memory 100 (to preserve ASCII task codes), while data transfers between memory and Processing Element(s) can be any appropriate width. The data bus can enter the Resource Manager unit module or can connect directly to the processor bus, with processor bus control signals managed by the Resource Manager unit. In this manner iMEM becomes largely data path width independent, in that task scheduling and task code execution do not depend directly on data path width.

ASCII Code Hierarchy

In addition to the distribution of native ASCII operator interpretation over three subsystems described above, iMEM devices can support at least two levels of ASCII code interpretation, native code at the task code level, via iMEM architecture implementation, and higher level code at the task data level, whereby the interpretation of ASCII commands stored in task data registers is performed by either the ASCII task code per se, the Processing Element hardware, or both. In this sense, ASCII commands read from task data space correspond to a 'high level interpreted language', while ASCII task code read from task code space corresponds to 'native code', which corresponds to binary executables in classical CPU architecture. For clarity, we stress that the iMEM ASCII native task code differs from classical CPUs in that the interpretation of the ASCII opcodes is performed directly by logic, with no binary executables involved, unlike classical CPUs in which ASCII commands are assembled or compiled into binary executables and linked and loaded into CPU code space.

Figure 11:
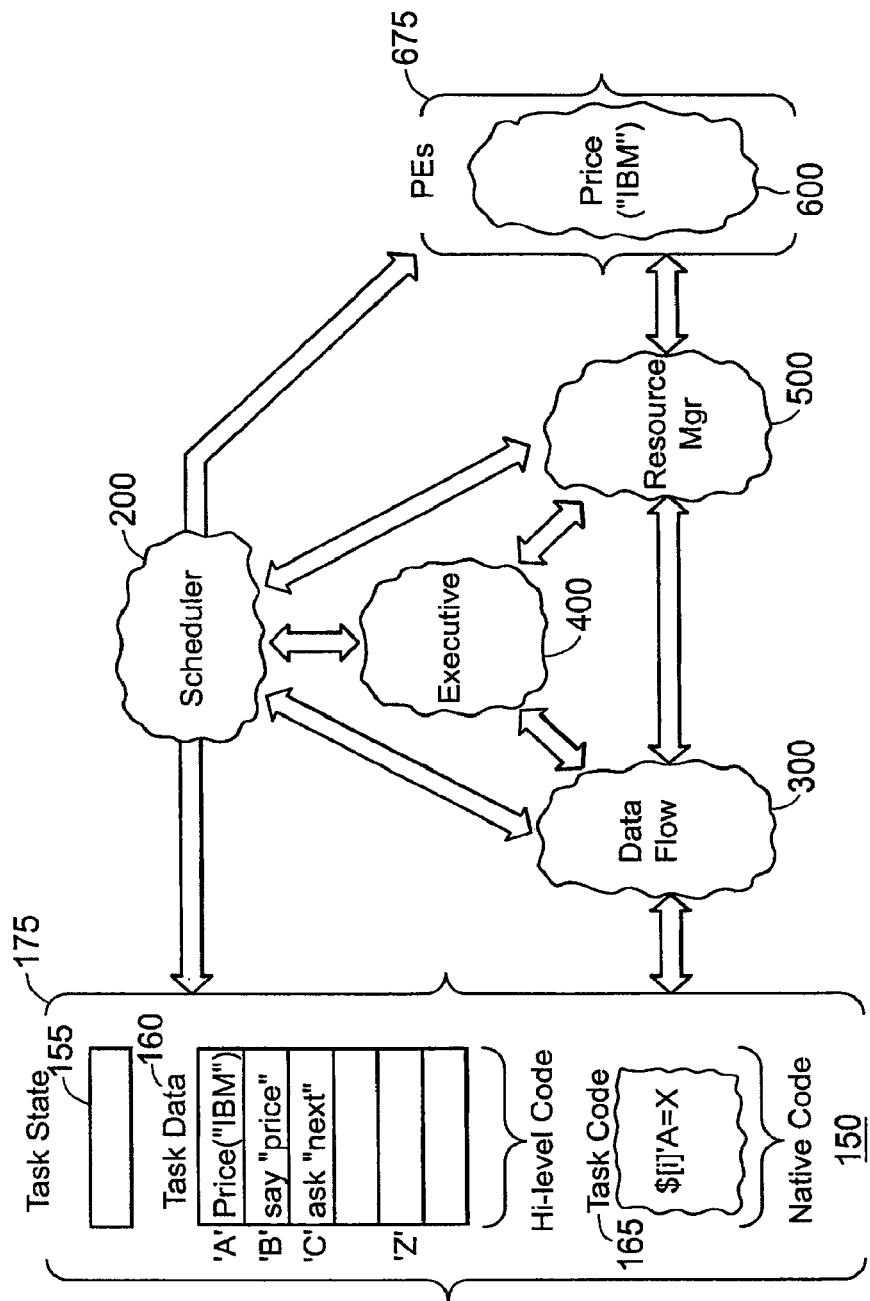
FIG. 11 shows the iMEM ASCII code hierarchy. Native ASII code in task code space is interpreted by iMEM hardware. Hi-level ASCII code in task data space can be interpreted either by the native task code software or by appropriate Processing Element hardware.

In FIG. 11, the high level code, shown in register A, is price ("IBM") and the low level task code 165 is $[i] 'A=X. iMEM begins executing the task code by fetching the resource request, $, and noting that the next character is the bracket, [, indicating an index is required. iMEM then fetches the index, i, and uses the result to request the specific resource 600, P[i]. The task then waits until PE[i] is available. When PE[i] is available, the task resumes, and the next task code, ', is fetched. This, in the preferred implementation, is the pass-through operator, which should be followed by either a data register name or a quote string. The effect of 'A is to pass the contents of the data register A to PE[i], where it is interpreted. In this case, PE[i] searches for the price of IBM stock. Because iMEM assumes that data register pass-through commands produce results, the task then enters the Wait_for_response state. (Note: pass-through quote strings do not wait for result.) When PE[i] finds the stock price, it signals such, and the task then copies the price into register X, as indicated by the task code. In this fashion iMEM native ASCII task code is interpreted by Execution hardware, while higher level application code is interpreted by Processing Element(s).

ASCII iMEM Compiler-Less Architecture

ASCII iMEM devices do not require compilers or assemblers, since ASCII task code is executed directly by the iMEM hardware, with no intermediate forms required. Because Assemblers, and Compilers are CPU and Operating System specific, this is a major advantage of iMEM. Because literally all modern computer systems provide some type of ASCII editor, iMEM is thus compatible with all CPUs and OSs, not simply those for which iMEM compilers have been written.

Figure 12:
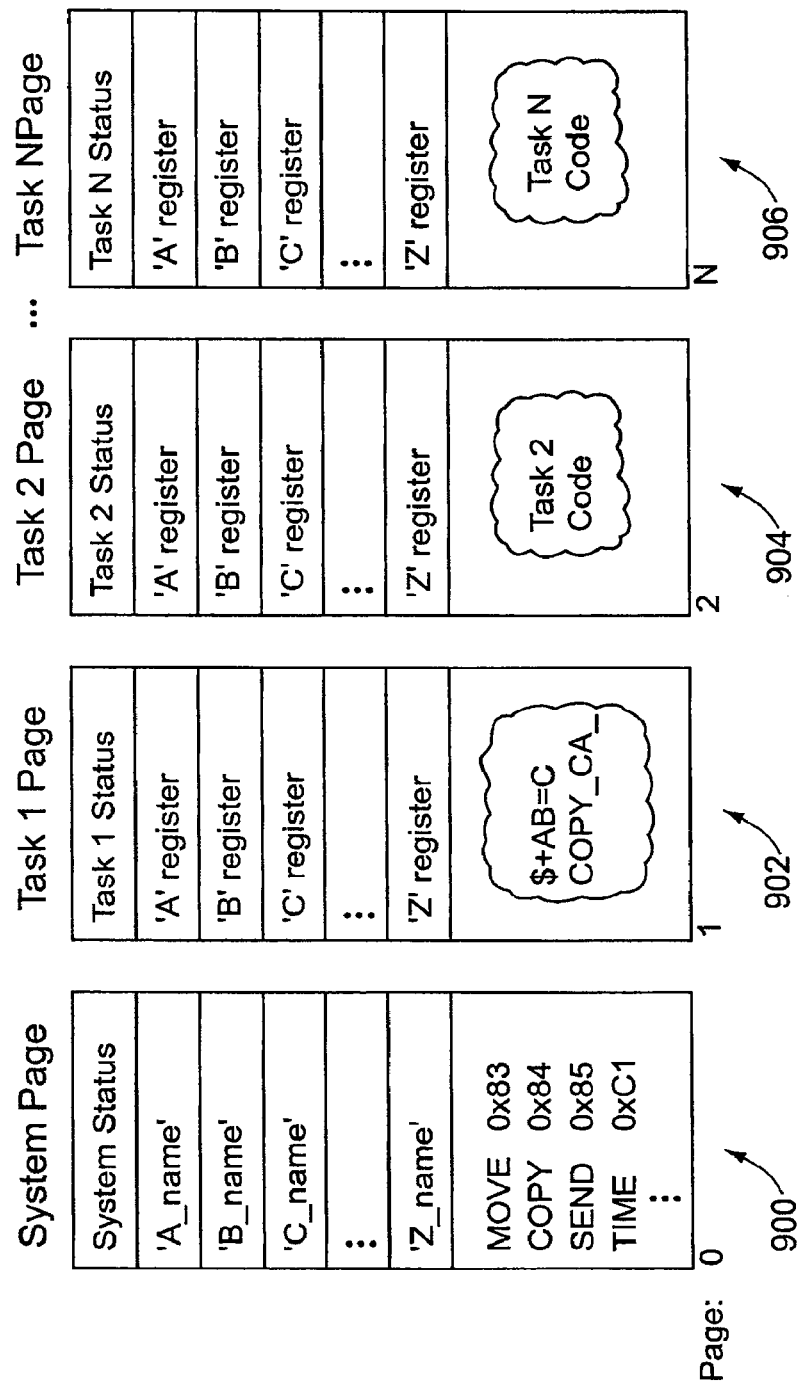
FIG. 12 shows the ASCII name structure supporting single-character ASCII register names.

Although single character names are convenient from an execution perspective, the use of longer alphabetic or alphanumeric names can be supported in a simple fashion by using the register 'image' on the system page 900, page 0, to hold multi-character names, thus system page register 'A' holds the (terminated) string name for task register 'A', and so forth. This scheme works for array operations in which all tasks operate on data in the same way, and all task data registers have the same meaning across tasks. For example if register 'Q' holds the electric charge for every task, then system register 'Q' can hold the ASCII string 'charge' identifying the type of data in all Q-registers. Based on this scheme, shown in FIG. 12, iMEM hardware can translate string names to register names and register names to string names, for "friendlier" programming. The actual iMEM task code that executes should always use the single character register names. In the default iMEM implementation, the CPU is assumed to setup both data registers and task codes, however standalone iMEM implementations, which allow program input from I/O channels, could use task register name strings, while converting actual task code to single character names. Thus, for example, for task code containing 26 or fewer independent variables, iMEM could build and scan the system page 'symbol tables' to translate arbitrary variable names to single character ASCII register names, allowing iMEM execution.

iMEM ASCII Translation

Figure 13:
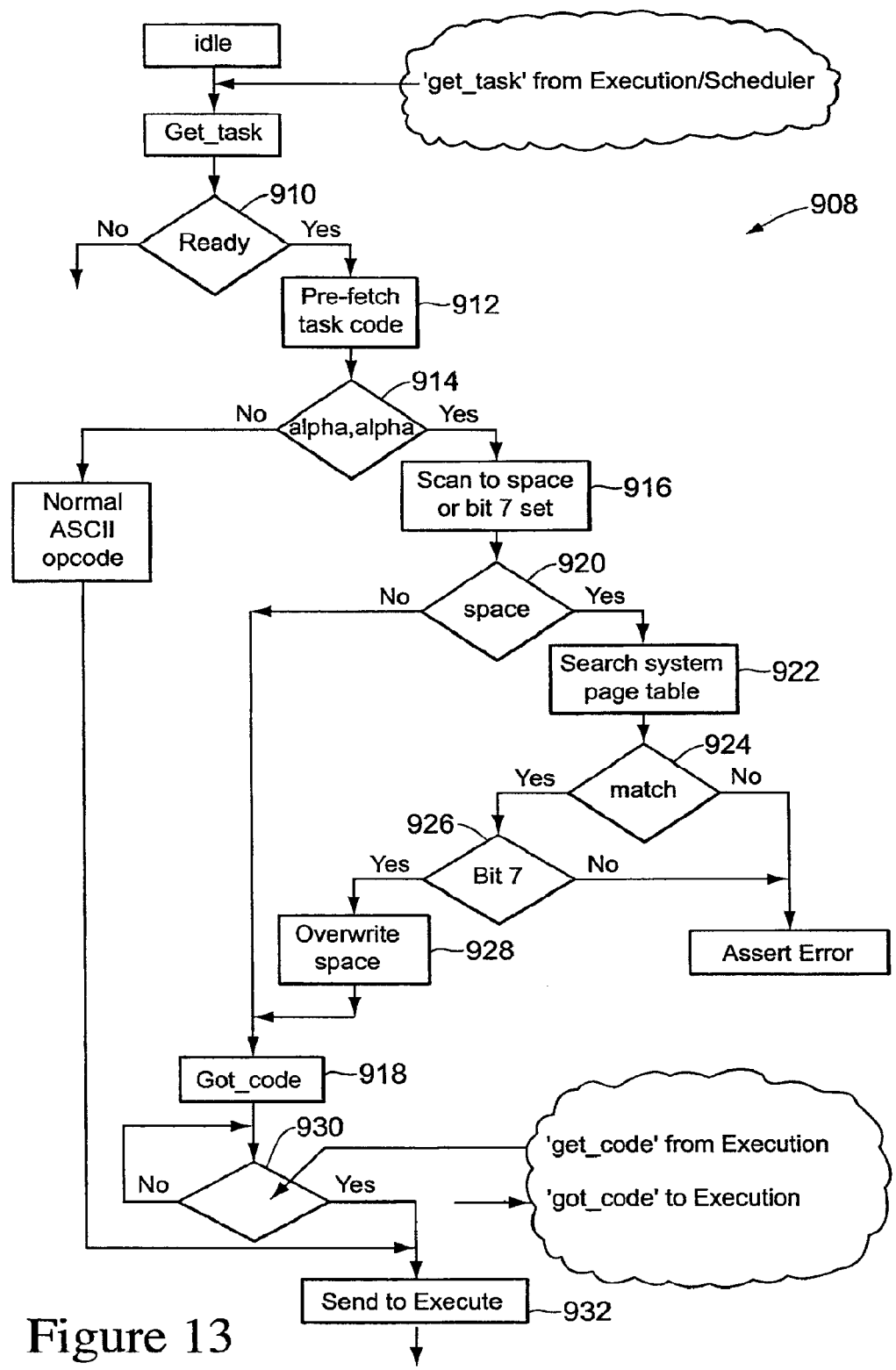
FIG. 13 shows iMEM ASCII code translation algorithm.

The iMEM Dataflow unit is used to fetch the task code from code space, upon receipt of the 'get_Code' signal from the Executive unit. Because the Dataflow unit also reads the task status 155 into the working task state registers 330, Dataflow can also look at the task state value, and, if the state is Ready_to_execute, can access the task pointer and 'prefetch' the task code. This capability offers a significant ASCII translation capability to iMEM architecture. An example is described below and illustrated in FIG. 13.

The System page, page 0, can be used to hold ASCII multi-character names for iMEM task data registers as described above. Following the registers on the system page, is system space available for task code support. In particular, multi-character ASCII commands can be stored in this space, followed by a specific byte of code to be described. These commands can be used to translate ASCII commands in task code space as follows.

When the Dataflow unit loads a Ready_to_execute 910 task state, it fetches the task pointer and prefetches, in step 912, the task code byte and the 'next byte'. If the task code byte is a valid iMEM code, typically an operator or punctuation character, as determined in step 914, the fetch terminates and, in step 932, it is sent to the execution unit. However, if the task code is an alphabetic character (reserved for Register names or labels) and the 'next byte' is also alphabetic, as determined in step 914, then the Dataflow unit assumes that the task code space holds (at least one) multi-character ASCII command that requires translation. The Dataflow unit then continues to prefetch, in step 916, alphabetic bytes until either a space byte, 0x20, or a byte with bit 7 set is encountered, as determined in step 920.

If the byte following the command has bit 7 set, as determined in step 920, then the Dataflow unit determines that this is actual task code to be presented to the Executive unit, when the 'get_Code' signal, in step 918, is asserted.

If the byte following the command is a space character, as determined in step 920, then Dataflow assumes that the System Page contains a table of ASCII commands followed by single bytes with bit 7 set, and proceeds to search, in step 922, the System page for the matching command. (Note that Dataflow must zero the Page address from the Scheduler unit while accessing System page.) The Dataflow unit searches the System page task code space for a character that matches the first byte of the command and continues scanning as long as the bytes match. If the first mismatch occurs, as determined in step 924, when the space character is encountered in the task code, then the corresponding byte in System space is assumed to be the single byte code with bit 7 set, and, after confirming, in step 926, that bit 7 is properly set, the Dataflow unit accesses the code, and writes it into the current task code page, overwriting, in step 928, the space character. In this way, a single search is required to translate the multi-byte ASCII command in the current task code space into a single byte used by the Executive unit. Thus, the next time the Dataflow prefetch mechanism encounters the multi-character ASCII code, it reaches, not the space, but the single byte with bit 7 set, as determined in step 920, and therefore does not initiate the search of the System page. In the ideal case, the prefetch occurs, in step 912, while the rest of the system is otherwise occupied, and requires little, if any, additional time for handling the multi-byte commands. Note that this mechanism allows the host CPU to build the translation tables in the System page in support of ASCII command task coding. Alternatively, in the standalone version, these tables are implemented in non-volatile memory. In anticipation of re-configurable technologies, the system can use bit 6 of the special code to distinguish between interpretation by the Executive unit and Processing Element as follows.

If bit 6 of the special code is zero, the Executive unit can interpret the code. If bit 6 is set to one, then the Executive unit can send the task code to the Processing Element through the Resource Manager unit, for interpretation and execution. In this way the iMEM architecture and scheduling and execution mechanisms can be preserved, while the Processing Elements can be reconfigured and programmed from task code using meaningful ASCII commands set up by the CPU in the System page translation table.

It is obvious that one skilled in the art could extend these mechanisms in various ways in support of the hardware ASCII code translation process, eliminating the need for the compiler technologies normally associated with such execution.

The iMEM CPU Task Index Register

Figure 14:
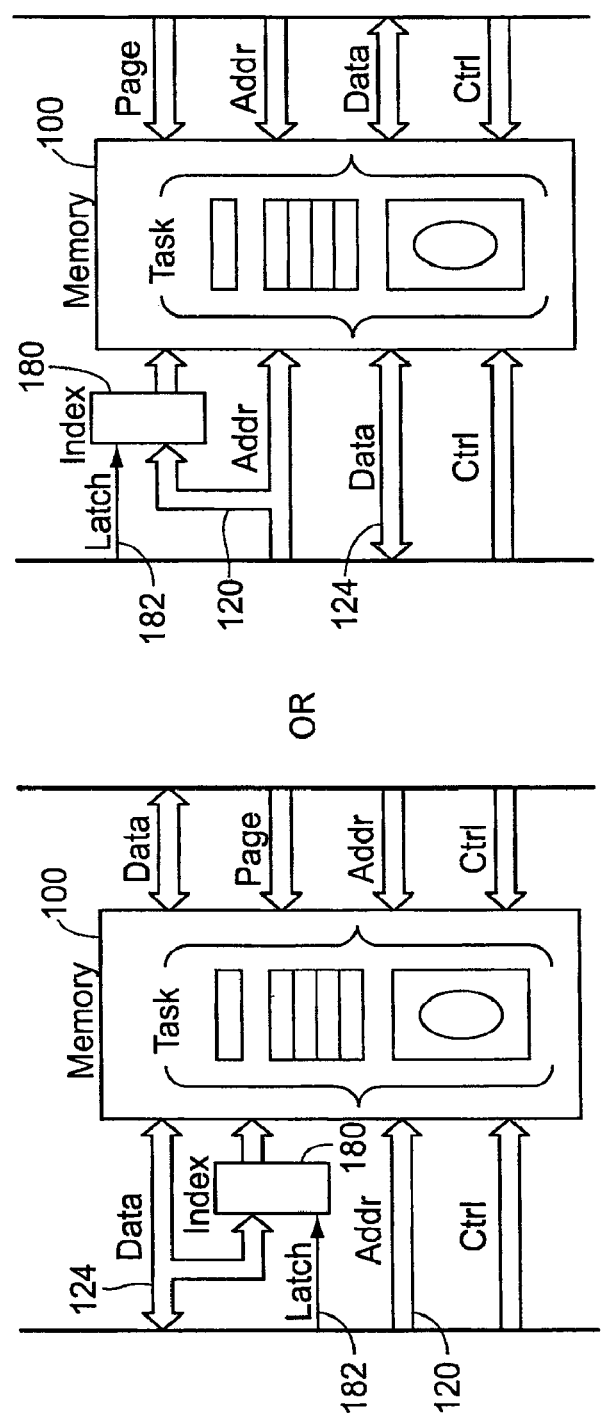
FIG. 14A shows load from data version of the iMEM Index Register architecture.
FIG. 14B shows load from address version of the IMEM Index Register architecture.
Figure 15:
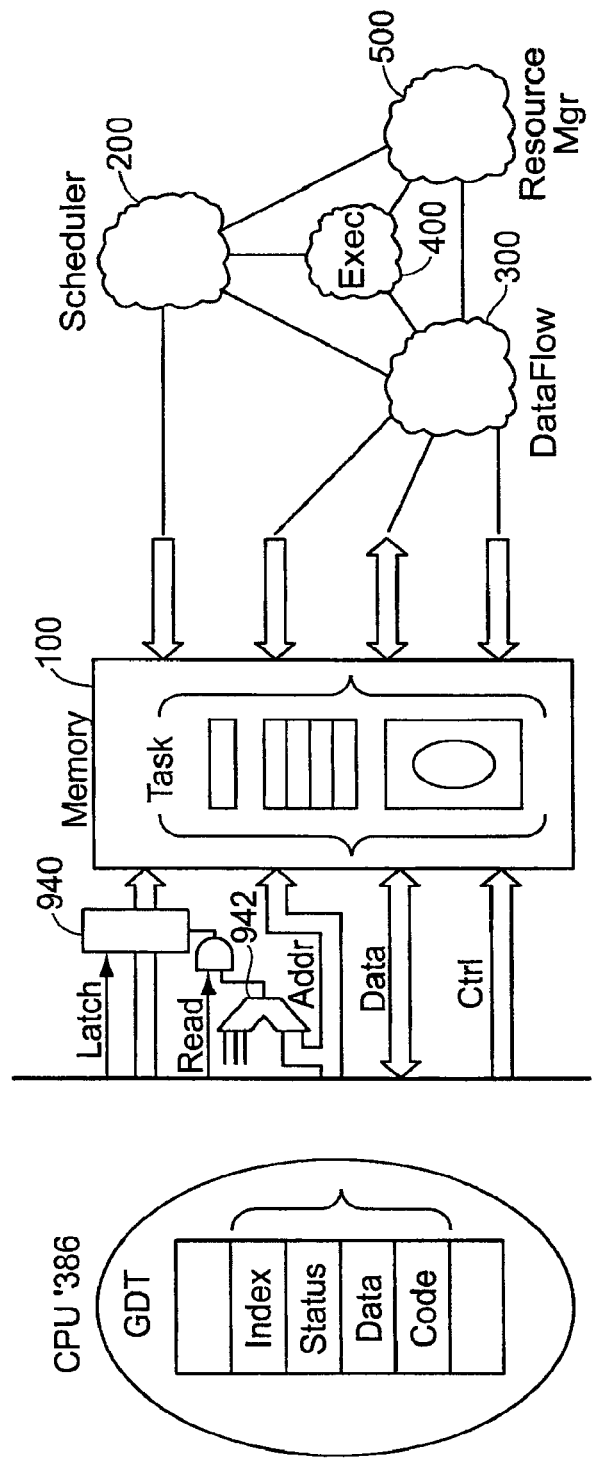
FIG. 15 shows the iMEM Task Index Register that provides compatibility with Intel 386 Global Descriptor Table architecture.

The Task Index Register 180, on the CPU side of the memory 100, corresponds to the Page address register on the MTC side of the memory, in that it selects the page to be accessed by the lower address bits. As shown in FIGS. 14A and 14B, the Task Index register can be loaded from the address bus 120, or the data bus 124, as appropriate, via CPU control of the Index latch signal 182. After the Task Index register 180 has been loaded, all CPU addresses appearing on the address bus access the Task Index-selected page of memory. In a segmented architecture, such as the Intel 386 and compatible CPUs, it is then feasible to create a segment corresponding to task status, another segment corresponding to task data, and another corresponding to task code space, such that these three segments always access the desired segments of the current task, where the current task, from the CPU perspective, is selected by the Index register, as shown in FIG. 15.

In systems that poll for iMEM interrupts by reading the task status register and examining the task state instead of using a hard interrupt, the Index register may be implemented using a pre-settable counter, such that the counter can be loaded from a data or address bus as described above, or can be loaded with pin-strapped information. The counter 940 of FIG. 15 can then be incremented (or decremented) via a signal produced by the output of a comparator 942 that compares the low address generated for a CPU read instruction with the on-page address of the status register, thus facilitating a polling scan of each task's status by the CPU without the necessity of having the CPU modify the contents of the index register between tasks. If the counter 940 is an up/down counter, then the normal behavior consists of a read of a task state that is not interrupting, followed by the auto increment (say) to the next task page, where the read is repeated. If the state is found to be interrupting, then the Index register now has selected the next page, not the interrupting page, therefore the CPU can immediately decrement the counter to return to the interrupting page. Since it is assumed that most tasks are not interrupting at a given time, then this is the most efficient way to scan.

iMEM Standalone Architecture

The CPU-based iMEM depends upon a host CPU to initialize memory and awaken the iMEM device. A standalone (hostless) iMEM optionally self-awakens and self initializes. Self-awakening requires little explanation. All devices that begin functioning after a power-on-reset effectively self-awaken. Self-initialization is also quite common and is ultimately based on non-volatile storage of initial code and data, including status data. Such non-volatile info is either directly accessed upon startup, or is copied into working RAM for operation.

Figure 16:
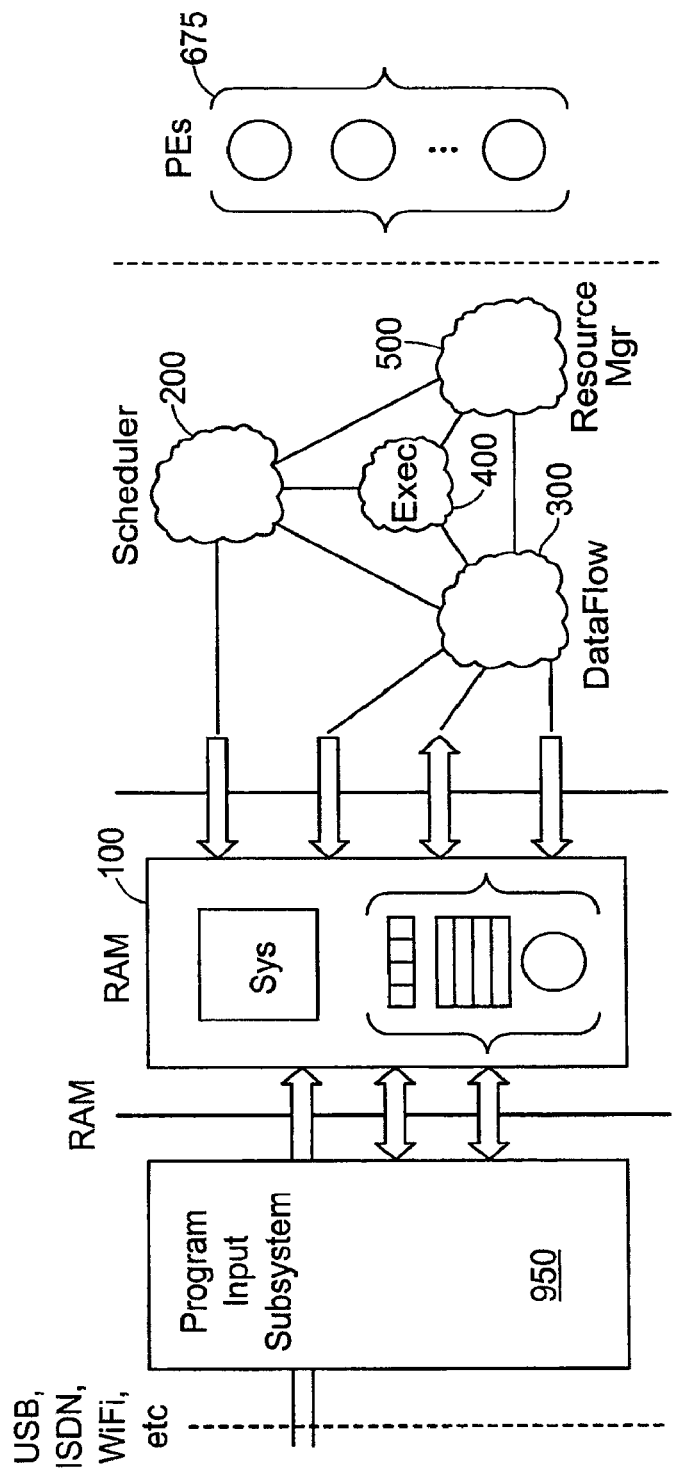
FIG. 16 shows a standalone iMEM device can support a communications channel and a program input subsystem in place of a host CPU.

Standalone iMEM devices either perform fixed functions, requiring no external program input, or require a program input channel 950, as shown in FIG. 16. The program input channel and subsystem 950 must minimally provide the following functionality:

Establish communication channel(s) and support communication protocol(s);

Provide RAM address selection (and address auto-increment) function(s); and

Provide RAM data write operation to download code and data to iMEM.

Alternatively, a more intelligent program input subsystem recognizes the iMEM task structure, and supports 'per task' programming vs. simply writing to specified RAM locations.

The distribution of 'program input' intelligence between iMEM and the program input subsystem is arbitrary. The program input subsystem can autonomously setup communications, download task state, code, and data, and then awaken iMEM, just as a host CPU would behave, or the iMEM can self-awaken, self initialize, optionally attempt to open a communication channel (or wait for one to be opened), and then wait for program input from the channel. These and other standalone iMEM support mechanisms are obvious to one skilled in the art.

An abundance of communication interfaces, including USB, ISDN, Ethernet, Wireless, and even UART and PS/2 Keyboard interfaces are feasible in support of iMEM standalone operation. With these power-up changes, iMEM can function in a standalone manner, with no CPU, or loosely coupled to a CPU via said communications channel.

iMEM Arrays iMEM architecture is designed to add true intelligence to memory, in order to support CPU-based systems in ways not before possible. Specifically, one host CPU can support multiple iMEM devices, up to the limit of the CPU address space, using the CPU address bus.

Figures 17A, 17B:
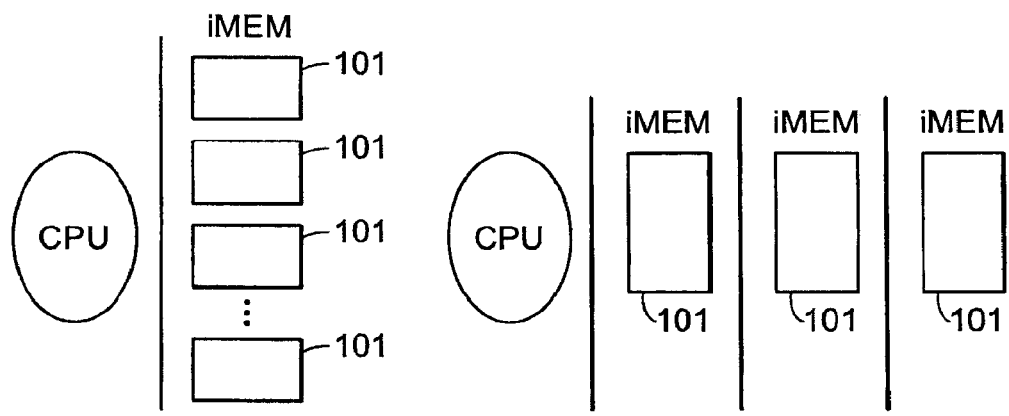
FIG. 17A shows a standard CPU-hosted 'vertical' array of iMEMs.
FIG. 17B shows a P-51-like 'horizontal' array of iMEM devices which are PE-linked.

Although iMEM distributed intelligence differs from multi-processor architecture, iMEM standalone arrays can be implemented, with either heterogeneous Processing Elements or homogeneous Processing Elements. iMEM devices can be linked in arrays similar to other Klingman inventions, such as P-51 Chains, (U.S. Pat. No. 6,021,453) and N-cell arrays (see U.S. patent application Ser. No. 09/531,911 titled "A Basic Cell For N-Dimensional Self-Healing Arrays", filed Mar. 20, 2000) due to the fact that iMEM Processing Elements optionally support a second interface 690 in FIG. 3A, either directly or through a shared switching module, allowing iMEMs, either hosted or standalone, to be cascaded or chained in the P-51 manner (see U.S. Pat. No. 6,021,453, titled "Microprocessor Unit For Use In An Indefinitely Extensible Chain Of Processors With Self-Propagation Of Code And Data From The Host End, Self-Determination Of Chain Length And ID, (And With Multiple Orthogonal Channels And Coordination Ports") In addition, the use of ASCII data reduces the data port widths in a manner desirable for use in 'N-cell' architectures. (see U.S. patent application Ser. No. 09/531,911 titled "A Basic Cell For N-Dimensional Self-Healing Arrays", filed Mar. 20, 2000) These 'vertical' and 'horizontal' array options are shown in FIGS. 17A and 17B, respectively.

Figure 18:
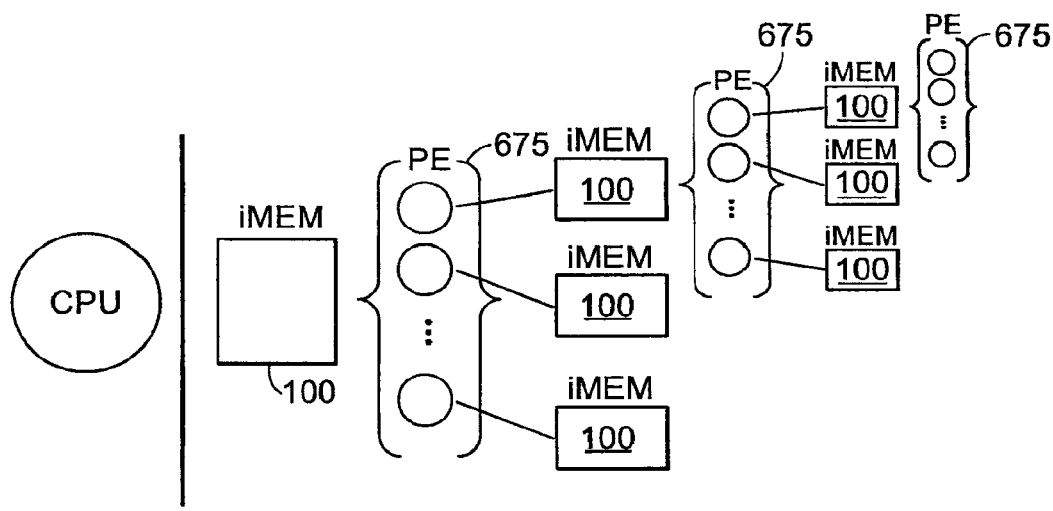
FIG. 18 shows an iMEM branching array topology with PE-linked iMEM tree.

Because iMEMs support an arbitrary number of Processing Elements, and each PE can optionally support another memory interface, then each PE can support a 'downstream' iMEM device, which can, in turn, support a multiplicity of PE-hosted iMEMs, and on, ad infinitum. An iMEM tree can be constructed limited only by practical concerns such as cost or power consumption, but architecturally unlimited. In this manner, iMEM branching arrays can be constructed with either homogeneous or heterogeneous Processing Elements, and with or without each PE supporting a downstream iMEM device. That is, any one of a given iMEM's Processing Elements can host another iMEM or not, on a PE-specific basis. This net-like architecture, shown in FIG. 18, becomes even more powerful when re-configurable PEs are considered.

Re-Configurable iMEM Architecture

The data format and data handling portions of iMEM can vary significantly from implementation to implementation. These can be 'hard' variations, in which a fixed data type is specified at powerup, along with appropriate data Processing Elements, or 'soft' variations such that configurable logic technology allows 'on-line' modification to data structures, data types, data-flow, and data-processing logic. Because, in theory, infinitely variable logic systems essentially unconstrain implementation architecture, to be useful, in a design sense, one must constrain architectures that are intended to interface naturally to today's CPUs, but that should also be capable of evolving to take advantage of expected technological advances, particularly in the area of dynamic reconfigurability.

Figure 19:
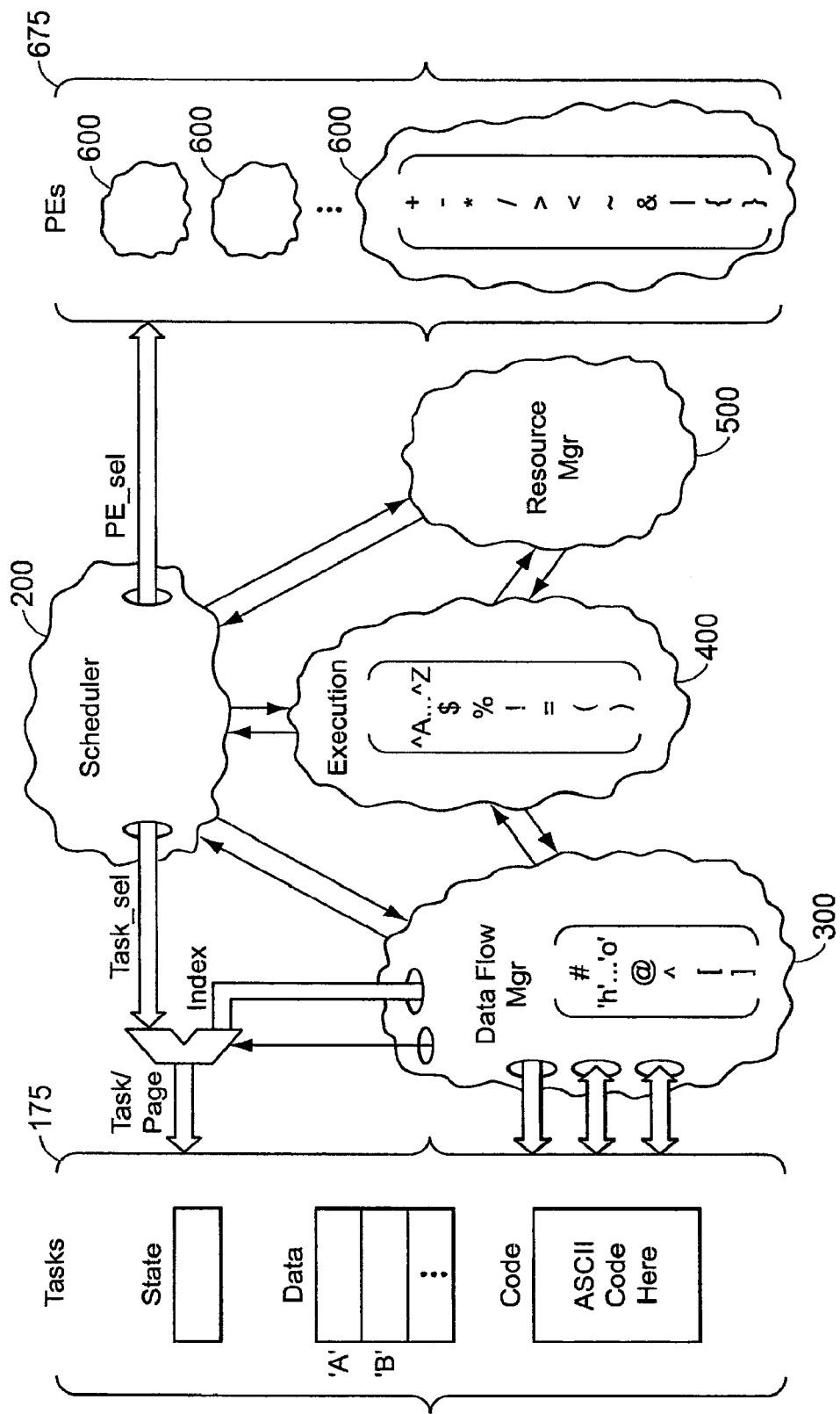
FIG. 19 shows the preferred implementation of iMEM reconfigurable architecture which restricts reconfiguration to one or more Processing Elements.

In expectation that real-time re-configurable logic circuitry is essentially unlimited in its application, such that portions of the logic can be statically fixed, while other portions can be dynamically reconfigured, either on a cycle by cycle basis, for synchronous circuitry, or module by module, for asynchronous systems. Those portions held fixed are used to implement iMEM control architecture, while the changing circuitry implement the data processing, and data-flow, portions of iMEM, as shown in FIG. 19. The preferred implementation of iMEM reconfigurable architecture preserves the interpretation and execution of iMEM ASCII System operators by the Execution subsystem, while reconfiguring one or more Processing Elements to re-interpret the iMEM ASCII Data operators (+ − * / ~ & | . _). Reconfigurable implementations support both homogeneous and heterogeneous Processing Element arrays. The shaded portion of FIG. 19 represents reconfigurable subsystem(s).

iMEM Clock Domains

The least frequently invoked signals tend to be the signals between the Scheduler unit and the Executive unit, which typically occur at the beginning and end of a task invocation.

In contrast, the data transfer operations and their management, occur frequently, almost constantly, therefore the events should be triggered/clocked as frequently as possible.

"As frequently as possible" means that the maximum changes occur per cycle, and this maximum is two, since we can effect transitions on both positive and negative edges of the clock.

Therefore, part of the iMEM architecture concerns the distribution of clock domains over the system. In terms of current technology, this implies, optimally, a single 'external' clock with synchronous connectivity, as is well understood by those skilled in the art. In terms of future technology, asynchronous modules, almost 'islands' in logic space, may exist with no global clock, and iMEM clocking should be compatible with such.

Figure 20:
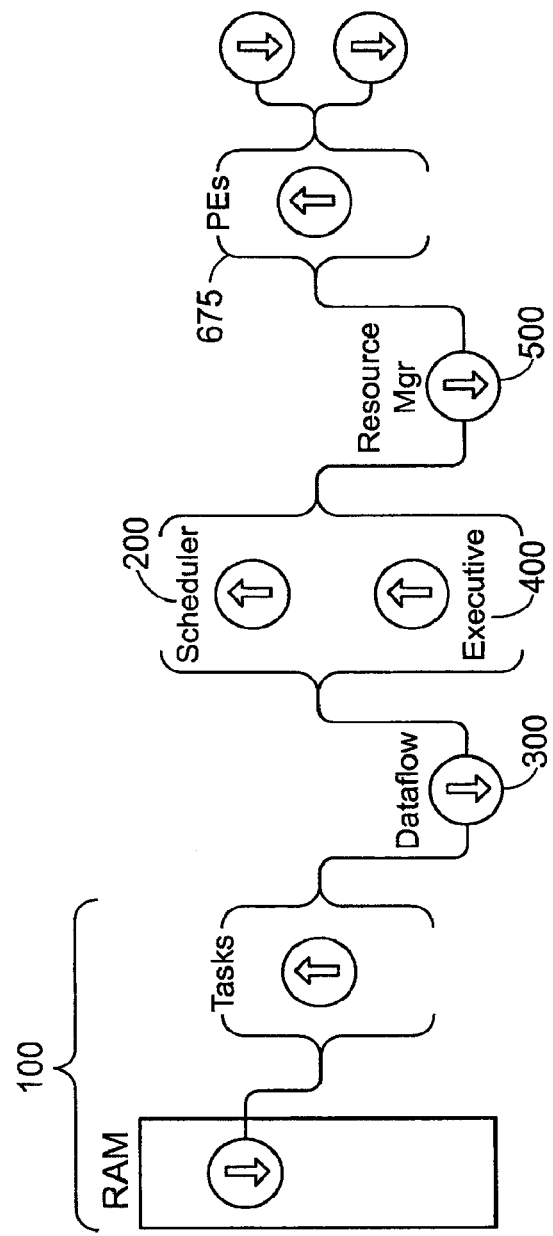
FIG. 20 shows the preferred iMEM clock domain distribution/topology.

In all clocking schemes, iMEM uses 'parallel' clocking for transitions between less frequently invoked systems/modules, and uses 'anti-parallel' between frequently invoked and interacting modules, as shown in FIG. 20. The direction of the arrow in each module indicates the clock edge upon which transitions occur. Tasks represent a dual-port wrapper around RAM and hence show different clock edges. In particular, in one embodiment, the PEs are clocked on the rising edge, the resource manager unit on the falling edge, the scheduler unit and executive unit on the rising edge, the dataflow unit on the falling edge, the iMEM side of the memory on the rising edge and the host side of the memory on the falling edge.

ihidden:

Although not necessary to the iMEM architecture, it is very desirable that the iMEM intelligence be hidden unless explicitly desired. Thus, the preferred implementation of the iMEM appears as a classical memory upon power-up, and requires activation by the host CPU before assuming any intelligent behavior.

Such activation could, of course, derive from external pins that the CPU manipulates through CPU I/O port(s) in the manner that PCI memory interface devices are made visible. (PCI configuration space).

The use of I/O ports is generally undesirable, and, in the case of a large number of iMEM devices in a system, even more so. For this reason the preferred "wakeup" method for iMEMs is classical memory compatible. That is, the algorithm applied to an iMEM awakens its intelligence, while the same algorithm applied to a classical memory has no unusual effect.

The "Wakeup" Algorithm

The preferred "wakeup" algorithm 952 for iMEM devices consists of a series of specific memory accesses to a specified memory address. For example and according to FIG. 21, assume that address 16 in the iMEM address space is first read in step 954, then a known sequence of bytes is written to the same address, say "(C)2000εKlingman," as indicated by steps 956 to 960. If this procedure is followed exactly, the iMEM awakens, and expects all relevant configuration information to exist in memory. Thus, before the wakeup algorithm is executed, the host CPU is expected to write relevant iMEM information into the memory.

Figure 21:
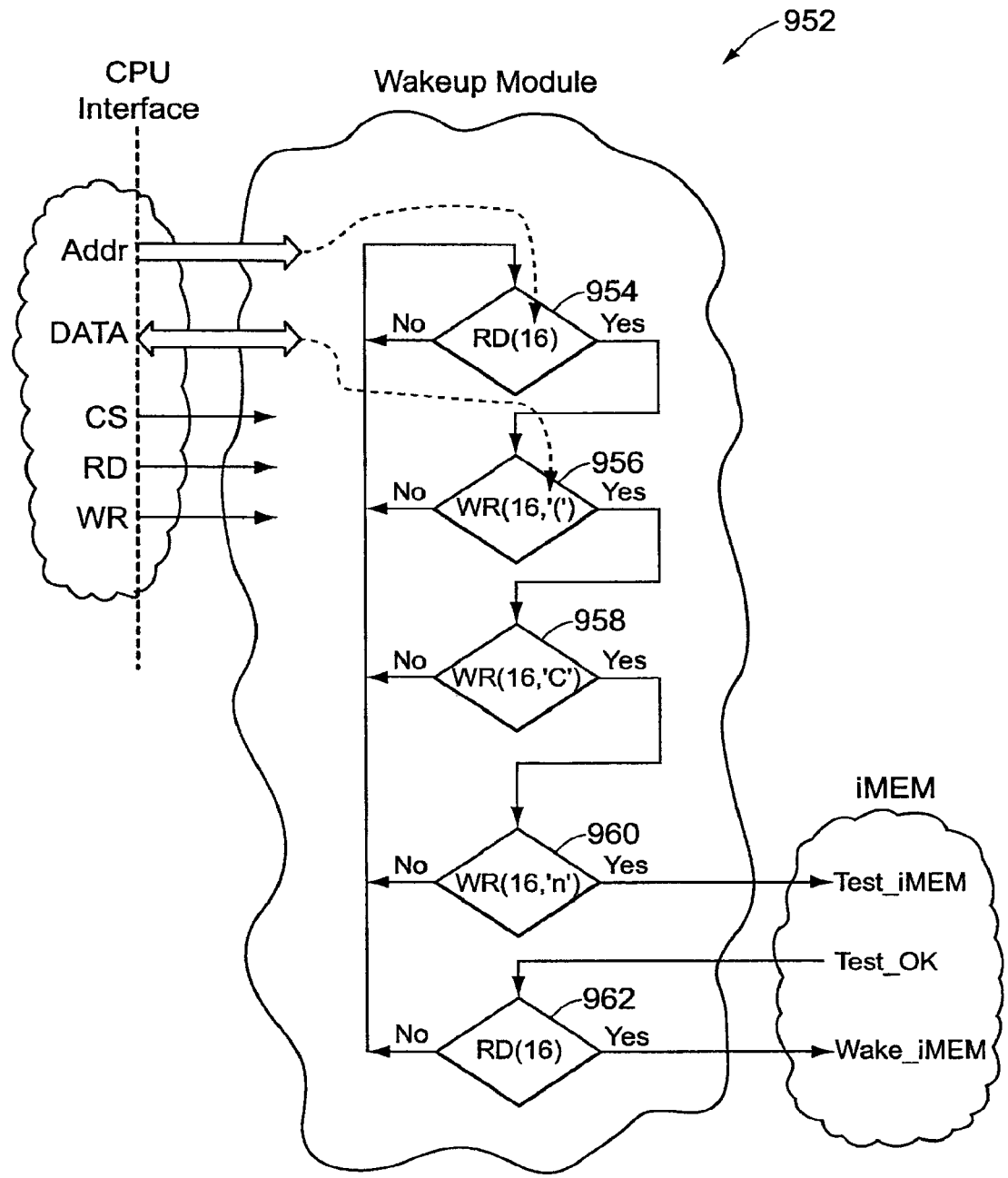
FIG. 21 shows a preferred iMEM 'wakeup' mechanism.

After awakening, the iMEM performs any necessary testing on memory configuration data, and possibly other self-tests, and writes a summary byte, in step 960, to the special address 16. Thus, the CPU, after performing the above algorithms, can delay for a short specified time duration and then read address 16, in step 962, in iMEM space. If the value is ASCII 'n', the last value written by the CPU, then the memory is a classical memory, and does not exhibit intelligence. If the CPU reads a byte other than 'n' from address 16, then the CPU can conclude that an iMEM occupies this address space, and, further, can determine the status of the iMEM after it has completed memory checks and self tests. This final CPU read of address 16 fully awakens the iMEM device, which begins task processing according to the information previously written to the iMEM by the CPU, as shown in FIG. 21.

Although this sequence of iMEM access by the CPU is extremely specific and nonrandom, nevertheless, it is (somewhat) conceivable that the CPU could read address 16 in iMEM space, then, quite by accident, write the special 16 bytes to this address, and finally even read address 16, thus inadvertently awakening the iMEM. To almost completely eliminate this possibility, the preferred iMEM implementation further checks to see that no address other than 16 is seen from the first read to the last read, including the 16 writes.

Processing Element Interface

As discussed earlier, the width of the datapath from memory to Processing Element is unspecified, but the preferred implementation uses an 8-bit data path. The following specification describes a preferred ASCII Floating-Point Computation Unit Processing Element interface. The interface consists of an eight-bit bi-directional data bus and the following control signals:

| | |
|---|---|
| unit_ready 970 | output |
| unit_select 972 | input |
| func_write 974 | input |
| data_read 976 | input |
| data_write 978 | input |

And the following internal structures:
   Tag_register 980
   Function register 982
   Status register 984
   Accuracy register 986
   Data register stack 988

In the preferred iMEM implementation, the Scheduler unit subsystem controls an array of unit select control signals, one per Processing Element. The Resource Manager unit controls the func_write 974, data_read 976, and data_write 978 signals, these three signals being shared by all Processing Elements, but only the selected Processing Element (the one receiving unit_select 972) responding to said signals. In similar fashion, the 8-bit bidirectional data bus 975 is shared by all Processing Elements, with every Processing Element except the selected one driving the data bus into the high impedance state. Each Processing Element controls a unit_ready signal 970, with all such signals monitored by the Resource Manager unit.

Figure 22:
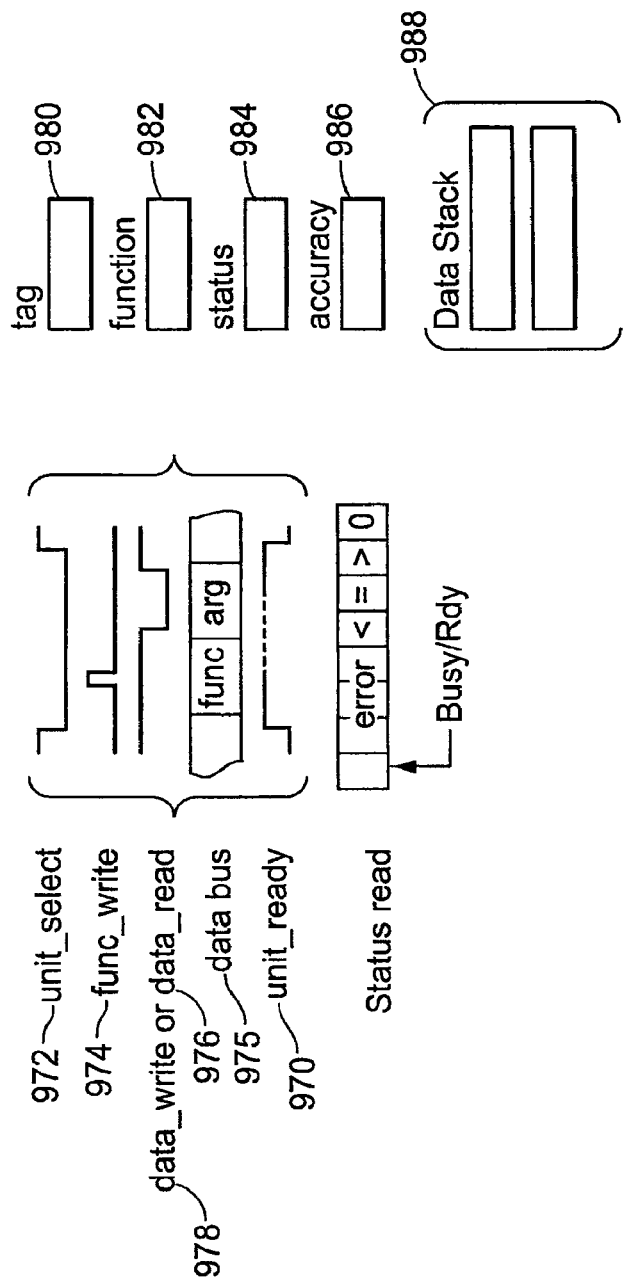
FIG. 22 shows the Processing Element signals and structure.

During operation, if the Resource Manager unit determines that a given Processing Element is ready, and the specific Processing Element has received unit_select 972, the Resource Manager unit drives a function code onto the data bus 975, and asserts the func_write 974 strobe. The function code is written into the Processing Element where it is interpreted and used to specify the nature of the current transaction. The Resource Manager unit then removes the function code from the data bus 975. If a data read operation is being performed, the Resource Manager unit places the data bus 975 in the high impedance state, and asserts the data_read control signal 976, causing the Processing Element to drive the appropriate data onto the data bus 975. If a data write operation is being performed, the Resource Manager unit asserts the data_write control signal 978, and causes the data source to place data on the data bus 975 to be written to the selected Processing Element, where it is handled according to the function specified in the preceding step. The relevant signal timing and register structure is shown in FIG. 22.

Although the present invention has been described in considerable detail with reference to certain preferred versions thereof, other versions are possible. Therefore, the spirit and scope of the appended claims should not be limited to the description of the preferred versions contained herein.

What is claimed is:
1. A computing system comprising:
   one or more processing elements;
   a memory having a first interface for connecting to a host processor and a second interface, the memory being divided into a plurality of logical partitions, each partition having a range of memory addresses, at least one partition having information describing a particular task, the information including contents of task state register and a task data register, the task data register having an ASCII name; and
   a multi-task controller (MTC) that includes a scheduler unit, a dataflow unit, an executive unit, and a resource manager unit,
      wherein each unit is separately coupled to each of the other units,
      wherein the dataflow unit is configured to transfer data between the second interface of the memory and one of either the scheduler unit, the executive unit, or resource manager unit,
      wherein the dataflow unit is configured to manage a mapping between registers with ASCII names and the memory addresses of a particular task,
      wherein the scheduler unit is coupled to the second interface of the memory and to the processing elements, the dataflow unit is coupled to the second interface of the memory, and the resource manager unit is coupled to the one or more processing elements,
      wherein the resource manager unit is configured to find an available processing element for carrying out a function of a task and to assign a processing element to a current task by providing a linkage between said available processing element and the task,
      wherein the scheduler unit is configured to select a task as the current task, to obtain the state of the current task via said dataflow unit, and select an assigned processing element to carry out a function of the current task,
      wherein the executive unit is configured to decode instructions relating to a task and request the resource manager unit to set up a processing element to carry out a function of a task; and
   wherein the number of processing elements and number of tasks are independent of each other.

2. A computing system as recited in claim 1, wherein the scheduler unit, the data flow unit, the execution unit, and the resource manager unit are each implemented as finite state machines.

3. A computing system as recited in claim 1, wherein the task state register and the task data register are each multiples of 8-bit bytes.

4. A computing system as recited in claim 1, wherein the at least one partition includes instructions for carrying out the task, each instruction being eight bits wide.

5. A computing system as recited in claim 4, wherein a task instruction is a 'request_resource' instruction that includes at least one ASCII character that indicates a request for resources, the request being recognized and decoded by the executive unit.

6. A computing system as recited in claim 5, wherein the ASCII character '$' indicates a request for resources is sent to the scheduler unit, the scheduler unit sending a signal to the resource manager unit indicating the request.

7. A computing system as recited in claim 5, wherein a 'perform_processing' task instruction that follows a 'request_resource' instruction includes any ASCII operator code that is supported by any of the processing elements.

8. A computing system as recited in claim 7,
wherein a task instruction indicates a number of ASCII-character designated names of task data registers on which the 'perform_processing' task instruction operates; and
wherein a processing element receiving the 'perform_processing' task instruction performs the operation indicated by the task instruction on the contents of the indicated task data registers, the names of said registers being associated with said ASCII operator code.

9. A computing system as recited in claim 1,
wherein, when a task has a 'Wait_for_resource' state, the scheduler unit is operative to request from the resource manager unit an indication of the availability of a desired resource; and
wherein, if the resource manager unit indicates that a resource is available, the task state changes from 'Wait_for_resource' to 'Ready_to_execute'; and
wherein, if the resource manager unit indicates that a resource is unavailable, the task state remains in the 'Wait_for_resource' state, and the resource manager unit causes the scheduler unit to select another task.

10. A computing system as recited in claim 1, wherein the task information includes a number of task data registers, the number of task data registers being at least one and not more than twenty-six and each task data register being successively labeled with a unique alphabetic character label starting with the character 'A'.

11. A computing system as recited in claim 1,
wherein the executive unit is operative to receive an ASCII operator and expects one or more ASCII register names on which an operation specified by the operator is to occur, each name representing a register and its contents contained in the task partition; and
wherein the executive unit is further operative to signal the dataflow unit to determine the location of the register in the task partition and to fetch the contents of the registers.

12. A computing system as recited in claim 1, wherein, when the task state is 'Ready_to_execute' and an ASCII transfer instruction is present, the executive unit is operative to cause a result to be unloaded from a processing element and transferred to a register in the task partition.

13. A computing system as recited in claim 1, wherein at least one processing element performs operations on binary data.

14. A computing system as recited in claim 1, wherein at least one processing element performs operations on ASCII data.

15. A computing system as recited in claim 1, wherein at least one processing element performs operations on UNICODE data.

16. A method of processing one or more tasks using one or more processing elements coupled to a multi-task controller, the multi-task controller being coupled to a memory at a first interface and a host processor being coupled to the memory at a second interface, the method comprising:
selecting, from the memory via the first interface, a next task for execution, the task having a stored state and a sequence of task instructions;
obtaining the stored state for the selected task;
for a task in a 'Ready_to_execute' state,
accessing the next task instruction in the sequence, and
if the task instruction is 'request_resource' instruction, generating appropriate signals, setting the task state to 'Wait_for_resource', and proceeding to the step of selecting a next task,
if the task instruction is a 'perform_processing' instruction, loading the relevant task data into the processing element, activating the processing element, linking the processing element to the task, setting the task state to 'Wait_for_response', and proceeding to the step of selecting a next task,
if the task instruction is a 'transfer_result' instruction, unloading the result from the processing element, copying to the relevant task data register, and setting the task state to 'Ready_to_execute',
if the task instruction is a 'signal_host' instruction, generating the appropriate signal to the host, setting the task state to 'Suspend', and proceeding to the step of selecting a next task,
if the task instruction specifies a non-processing operation to be performed, performing the specified non-processing function, and setting the task state to 'Ready_to_execute';
for a task in the 'Wait_for_resource' state, waiting until a processing element is available to perform a function of the selected task and setting the task state to 'Ready_to_execute;' for a task in the 'Wait_for_response' state, determining whether or not a response is available from the linked processing element, and setting the task state to 'Ready_to_execute,' and if a response is not available, setting the task state to 'Wait_for_response'; and
for a task in a 'Suspend' state, waiting for the host processor to set the task state to 'Ready_to_execute', after the host processor appropriately accesses the memory via the second interface.

* * * * *